United States Patent
Soga

(10) Patent No.: US 7,457,375 B2
(45) Date of Patent: Nov. 25, 2008

(54) TIMING EXTRACTOR, TIMING EXTRACTION METHOD, AND DEMODULATOR HAVING THE TIMING EXTRACTOR

(75) Inventor: Shigeru Soga, Nishinomiya (JP)

(73) Assignee: Panasonic Corporation, Osaka (JP)

( * ) Notice: Subject to any disclaimer, the term of this patent is extended or adjusted under 35 U.S.C. 154(b) by 928 days.

(21) Appl. No.: 10/520,616

(22) PCT Filed: Jun. 7, 2004

(86) PCT No.: PCT/JP2004/008246

§ 371 (c)(1),
(2), (4) Date: Jan. 10, 2005

(87) PCT Pub. No.: WO2005/006694

PCT Pub. Date: Jan. 20, 2005

(65) Prior Publication Data

US 2005/0253742 A1 Nov. 17, 2005

(30) Foreign Application Priority Data

Jul. 11, 2003 (JP) ............................. 2003-273698

(51) Int. Cl.
*H04L 27/00* (2006.01)

(52) U.S. Cl. ................ 375/324; 375/279; 375/280; 375/316; 375/326; 375/327; 375/355; 375/376; 329/304; 329/307; 329/325; 329/360

(58) Field of Classification Search ................ 375/279, 375/280, 316, 324, 326, 327, 355, 376; 329/304, 329/307, 325, 360
See application file for complete search history.

(56) References Cited

U.S. PATENT DOCUMENTS 5,442,656 A 8/1995 Kaku et al.

FOREIGN PATENT DOCUMENTS

| EP | 0 554 036 A2 | 8/1993 |
|---|---|---|
| JP | 61-45658 A | 3/1986 |
| JP | 1-255338 A | 10/1989 |
| JP | 3153792 B2 | 7/1991 |
| JP | 5-207082 A | 8/1993 |
| JP | 6-120935 A | 4/1994 |
| JP | 7-226781 A | 8/1995 |
| JP | 2555140 B2 | 8/1996 |
| JP | 3-3369291 | 5/1999 |
| JP | 11-127133 A | 5/1999 |

*Primary Examiner*—Chieh M Fan
*Assistant Examiner*—Siu M Lee
(74) *Attorney, Agent, or Firm*—McDermott Will & Emery LLP

(57) ABSTRACT

In a timing component extractor for a digital modulated signal, a frequency converting section 30 receives a complex baseband signal having a symbol rate fs and formed from an I signal and a Q signal, and converts frequency components ±fs/2, which are present in the complex baseband signal as the data changes, to frequency components ±fs/4. The I signal and Q signal of the complex baseband signal are then nonlinearly processed. In other words, multipliers 31, 32 square the I signal and the Q signal, respectively, and an adder 33 adds the respective results of the multipliers 31, 32. A BPF 34 extracts the frequency components ±fs/2 from the output of the adder 33, and outputs the extracted frequency components ±fs/2 as a timing signal. Accordingly, processing can be conducted at a sampling frequency which is twice the symbol rate fs. Moreover, timing extraction can be stably conducted without being affected by a carrier frequency offset.

16 Claims, 18 Drawing Sheets

TIMING EXTRACTOR, TIMING EXTRACTION METHOD, AND DEMODULATOR HAVING THE TIMING EXTRACTOR

TECHNICAL FIELD

The present invention relates to a timing extractor and a timing extraction method for extracting timing required to demodulate a digital modulation system such as a PSK (Phase Shift Keying) system and a QAM (Quadrature Amplitude Modulation) system used in digital satellite TV broadcasting, digital cable TV broadcasting and the like.

BACKGROUND ART

Japanese Patent No. 2,555,140 (Document 1) describes a method for extracting a timing component in order to demodulate a digital modulated signal of a PSK system, a QAM system or the like and reproduce information contained in the signal. In this method, a frequency component fs is extracted by nonlinearly processing a frequency component fs/2 (i.e., a frequency component which is ½ times a symbol rate fs) which is present in a digital modulated signal as symbol data changes.

Since this extraction method uses nonlinear processing, timing extraction can be stably conducted without being affected by a carrier frequency offset produced by a frequency error of a local oscillator used in a receiver. In order to extract a frequency component fs, digital signal processing must be conducted at a sampling frequency higher than 2fs according to the sampling theorem. A sampling frequency of 4fs or more is usually used in order to prevent interference.

Japanese Patent Laid-Open Publication No. 5-207082 (Document 2) describes another method for extracting a timing component. In this method is extracted a frequency component fs/2 which is present in a digital modulated signal as symbol data changes. The extracted frequency component is then subjected to vector processing, frequency shifting, and double angling. Accordingly, timing extraction can be conducted at a sampling frequency 2fs.

Japanese Patent Laid-Open Publication No. 7-226781 (Document 3) describes still another method for extracting a timing component. In this method, a frequency component fs is extracted at a sampling frequency 2fs by nonlinearly processing an averaged digital signal and obtaining the difference between the nonlinearly processed signal and a one-sample delayed version of that signal.

Problems

The method of Document 1 requires digital signal processing at a sampling frequency 4fs for stable timing extraction. This results in difficulty in hardware implementation and increased power consumption if the symbol rate is high. Even at a low symbol rate, this results in increased amount of processing per unit time if a DSP is used.

The method of Document 2 is affected by a carrier frequency offset produced by a frequency error of a local oscillator used in a receiver, because the method uses vector processing. Such a carrier frequency offset prevents accurate timing extraction.

The extraction method of Document 3 uses a sampling frequency 2fs. An extracted signal therefore causes interference according to the sampling theorem, thereby preventing stable timing extraction.

DISCLOSURE OF THE INVENTION

The present invention is made in order to solve the above problems, and it is an object of the present invention to provide a timing extraction method which enables digital signal processing at a sampling frequency as low as 2fs as well as facilitates hardware implementation even at a high symbol rate fs, and also enables interference-free, stable timing extraction without being affected by a carrier frequency offset.

In order to achieve the above object, according to the present invention, the following processing is conducted to demodulate a digital modulated signal and reproduce information included in the digital modulated signal: a complex baseband signal formed from an I signal and a Q signal is obtained from a digital modulated signal having a symbol rate fs. Positive and negative frequency components of fs/2 included in the complex baseband signal are converted to such a frequency position that does not cause interference with other frequency components. The resultant I and Q signals are then at least squared. A frequency component which is twice the frequency position is then extracted.

More specifically, a timing extractor according to the present invention extracts a timing component for determining a symbol from a digital modulated signal having a symbol rate fs. The timing extractor includes a frequency converting means for converting positive and negative frequency components of fs/2 included in a complex baseband signal to a frequency position fm ($0<|fm|<fs/2$). The complex baseband signal is obtained from the digital modulated signal and formed from an I signal and a Q signal. The timing extractor further includes a nonlinear processing means for at least squaring the I signal and the Q signal resulting from frequency conversion by the frequency converting means, and a frequency extracting means for extracting from an output signal of the nonlinear processing means a frequency component 2fm, i.e., a frequency component which is twice the frequency position fm, and outputting the extracted frequency component as a timing signal.

In the above timing extractor, the frequency position fm may be $|fm|=fs/2M$ (where M is an integer of at least two).

In the above timing extractor, M may be M=2 and the frequency position fm may be $|fm|=fs/4$.

In the above timing extractor, M may be M=4 and the frequency position fm may be $|fm|=fs/8$.

In the above timing extractor, the frequency converting means may include a filtering means for removing in advance from the complex baseband signal a frequency component which will become an aliasing distortion component for the frequency component 2fm included in the output signal of the nonlinear processing means.

In the above timing extractor, the frequency converting means may include a first frequency shifting means for shifting a frequency of the complex baseband signal in a frequency increasing direction, and a second frequency shifting means for shifting a frequency of the complex baseband signal in a frequency decreasing direction.

In the above timing extractor, the frequency converting means may include a frequency shifting means for shifting a frequency of the complex baseband signal in a frequency increasing direction and a frequency decreasing direction by fs/2.

In the above timing extractor, the frequency converting means may include a bandpass filtering means for extracting the positive and negative frequency components of fs/2 included in the complex baseband signal.

In the above timing extractor, the frequency converting means may include a numerical operation means for calculating upon every two samplings a true value multiplied by $\sqrt{2}$ as the positive and negative frequency components of fs/2 converted to the frequency position fm.

In the above timing extractor, the nonlinear processing means may include two multiplying means for squaring the I signal and the Q signal resulting from frequency conversion by the frequency converting means, respectively, an adder for adding the I and Q signals squared by the multiplying means, a bit shifting means for multiplying an output of the adder by ½, and a selecting means for selecting the output of the adder or an output of the bit shifting means.

In the above timing extractor, the frequency extracting means may output the timing signal once every L times when the frequency position fm is |fm|=fs/($2^2$×L) (where L is an integer of at least one).

In the above timing extractor, the first and second frequency shifting means each may include a filtering means for removing in advance an interference component which is present in the frequency position fm.

In the above timing extractor, the frequency converting means may complex add respective outputs of the first and second frequency shifting means.

According to the present invention, a method for extracting a timing component for determining a symbol from a digital modulated signal having a symbol rate fs includes the step of converting positive and negative frequency components of fs/2 included in a complex baseband signal to a frequency position fm (0<|fm|<fs/2). The complex baseband signal is obtained from the digital modulated signal and formed from an I signal and a Q signal. The method further includes the steps of: at least squaring the I signal and the Q signal resulting from the frequency conversion; adding the squared I and Q signals; and extracting from the added signal a frequency component 2fm, i.e., a frequency component which is twice the frequency position fm, as a timing signal.

In the above method, the frequency position fm may be |fm|=fs/2M (where M is an integer of at least two).

A demodulator according to the present invention includes: an antenna for receiving a digital modulated signal; a semi-synchronous wave detecting means for quadrature-detecting the digital modulated signal received by the antenna to obtain a complex baseband signal formed from an I signal and a Q signal; an A-to-D converting means for converting the complex baseband signal obtained by the semi-synchronous wave detecting means from analog to digital values; and the timing extractor. The digital complex baseband signal obtained by the A-to-D converting means is sampled at a sampling frequency 2fs based on a timing signal from the timing extractor, whereby demodulated data is obtained.

According to the present invention, the positive and negative frequency components of fs/2 included in the complex baseband signal are converted to the frequency position fm. The frequency position fm is smaller than half the symbol rate fs. In other words, 2fm is smaller than fs. Therefore, even though the sampling frequency is 2fs, the positive and negative frequency components of fs/2 converted to the frequency position fm will not interfere with aliasing distortion components according to the sampling theorem, and power consumption can be reduced. Moreover, since the frequency component fs is extracted by squaring, i.e., by nonlinear processing, timing extraction can be stably conducted without being affected by a carrier frequency offset.

In particular, according to the present invention, complex multiplication to be implemented by frequency conversion of the frequency operation means can be implemented by the bit shifting means and the selecting means of the nonlinear processing means. This enables reduction in circuit scale.

Moreover, according to the present invention, the timing extractor need only output a timing signal once every L times. This enables significant reduction in operation amount per unit time in a timing error detector and a loop filter which are provided in a subsequent stage.

BEST MODE FOR CARRYING OUT THE INVENTION

Hereinafter, embodiments of the present invention will be described in detail with reference to the accompanying drawings.

FIRST EMBODIMENT

Figure 1:
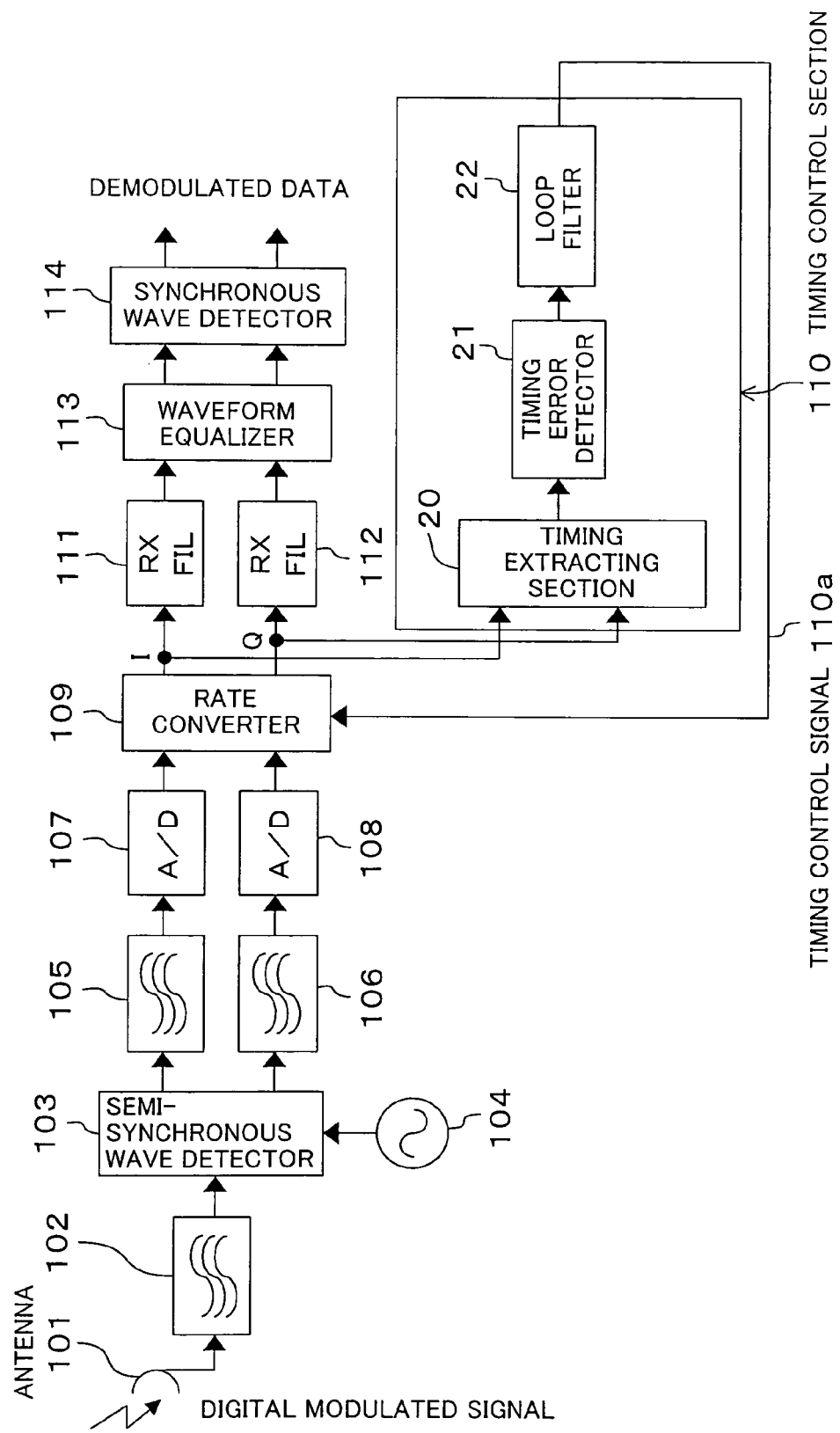
FIG. 1 is a block diagram showing the structure of a demodulator using a timing extraction method according to a first embodiment of the present invention.

FIG. 1 is a block diagram showing the structure of a demodulator for demodulating a digital modulated signal such as a QPSK (Quadrature PSK) signal and a QAM signal by a timing extraction method of the first embodiment of the present invention.

The demodulator will now be described. In FIG. 1, an antenna 101 receives a digital modulated signal. A down converter 102 converts the signal received by the antenna 101 to a desired intermediate frequency band and outputs the resultant signal.

A semi-synchronous wave detector (semi-synchronous wave detecting means) 103 quadrature-detects the received signal at a fixed oscillation frequency of a local oscillator 104, and outputs in-phase and quadrature components of the signal. Low pass filters (LPFs) 105, 106 remove harmonic components from a complex baseband signal formed from the in-phase and quadrature components received from the semi-synchronous wave detector 103, and output the resultant signal. A-to-D converters (A-to-D converting means) 107, 108 sample the complex baseband signal received from the LPFs 105, 106 by using a clock signal higher than twice a symbol rate fs, and convert the complex baseband signal from analog to digital values.

A rate converter 109 converts the rate of the digital complex baseband signal from the A-to-D converters 107, 108 based on a timing control signal 110a from a timing control section 110 (the timing control section 110 will be described later), and outputs the resultant signal at a sampling rate 2fs.

Digital filters (RX-FILs) 111, 112 receive the signal from the rate converter 109, shape the spectrum of the received signal so as to prevent intersymbolic interference in digital data transmission, and output the resultant signal. A waveform equalizer 113 equalizes a ghost waveform produced by reflection in a transmission path or the like, and outputs the resultant signal. A synchronous wave detector 114 corrects a carrier frequency offset and outputs demodulated data.

A timing control section 110 receives from the rate converter 109 the complex baseband signal formed from the in-phase signal (I) and the quadrature signal (Q) at the sampling rate 2fs, and outputs a timing control signal 110a to the rate converter 109. The timing control section 110 and the rate converter 109 thus form a feedback loop. The timing control section 110 includes a timing extracting section 20, a timing error detector 21, and a loop filter 22.

The timing extracting section (timing extractor) 20 extracts timing components for determining symbols from the complex baseband signal received from the rate converter 109, and outputs the extracted timing components to the timing error detector 21.

Figure 2:
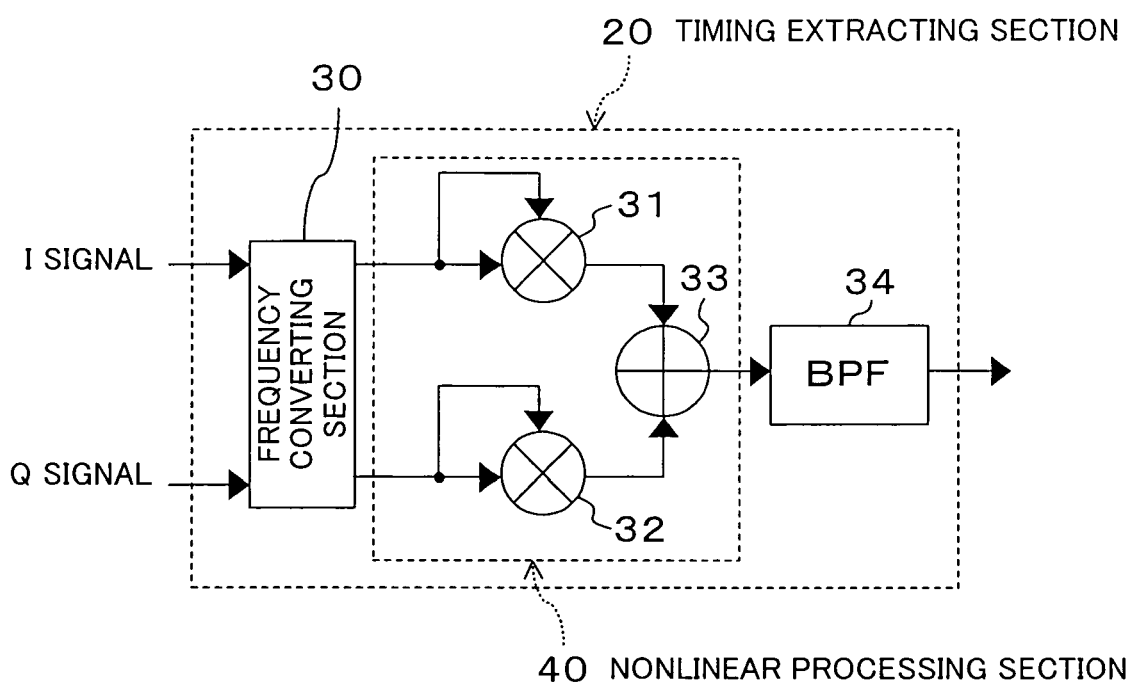
FIG. 2 is a block diagram showing a specific example of the structure of a timing extracting section according to the first embodiment.

FIG. 2 shows a specific example of the structure of the timing extracting section 20. The timing extracting section 20 includes a frequency converting section 30, two multipliers (multiplying means) 31, 32, an adder (adding means) 33, and a bandpass filter (BPF) 34.

Figure 3A:
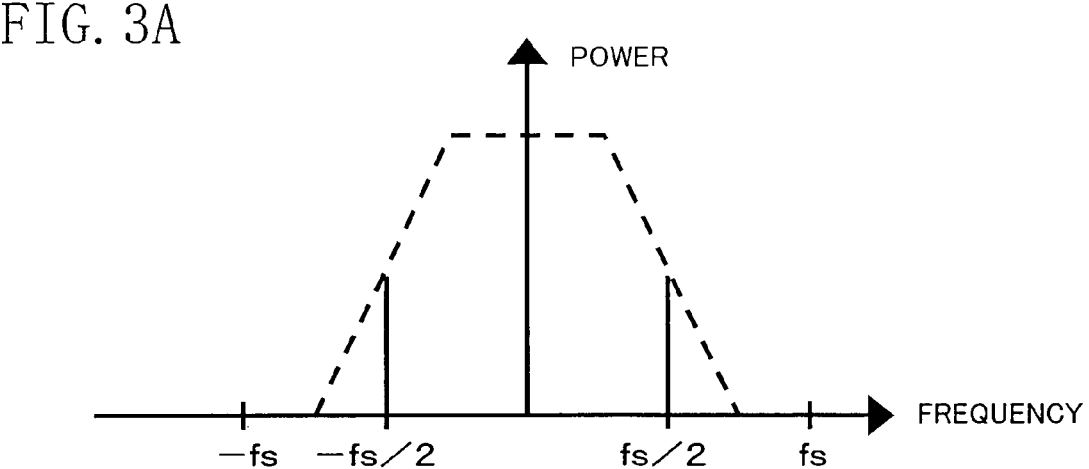
FIG. 3 shows frequency characteristics illustrating operation principles of a frequency converting section according to the first embodiment, wherein (a) shows a spectrum of a complex baseband signal after rate conversion, (b) shows frequency components ±fs/2 converted to frequency positions ±fs/4, and (c) shows frequency components ±fs/4 converted to direct current components and frequency components ±fs/2.
Figure 3B:
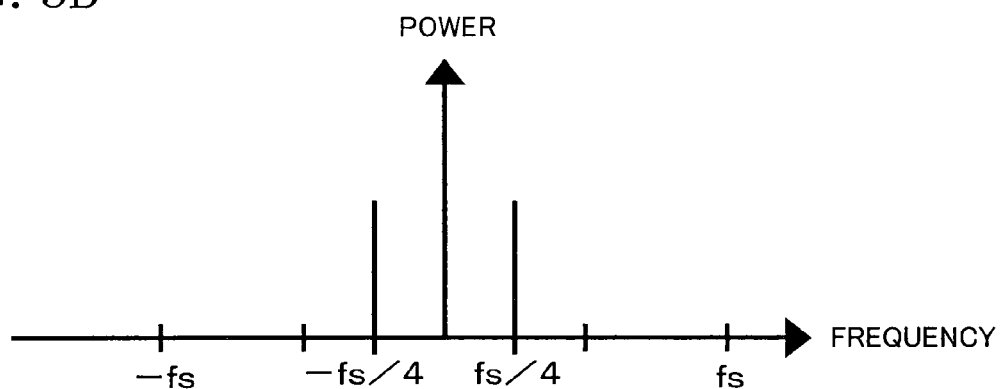
Figure 3C:
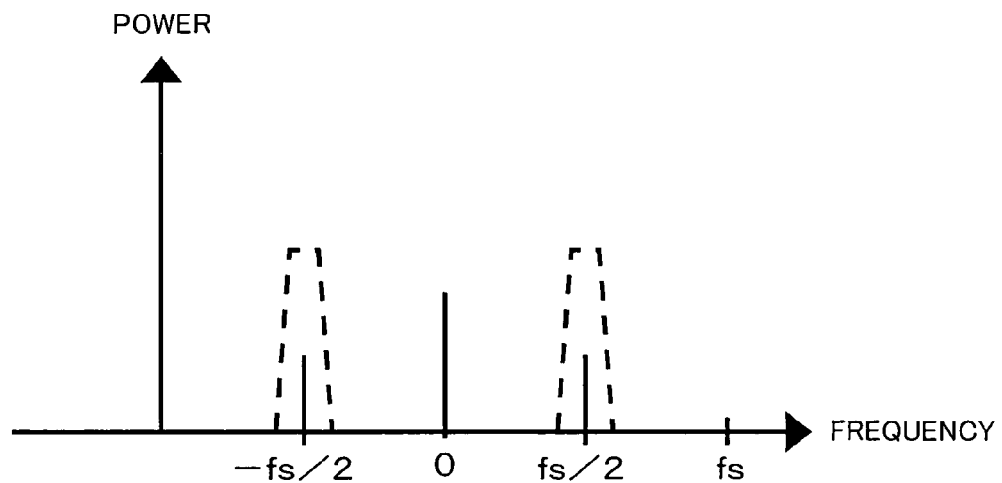

A specific operation example of the frequency converting section (frequency converting means) 30 will now be described briefly with reference to (a) and (b) of FIG. 3. In FIG. 3, (a) shows a spectrum of the complex baseband signal after rate conversion. In (a) of FIG. 3, dashed line indicates a spectrum of a digital modulated signal, and solid line indicates ±fs/2 frequency components which are present in the digital modulated signal changing at a symbol rate fs.

The frequency converting section 30 receives the complex baseband signal from the rate converter 109, and converts ±fs/2 frequency components to ±fs/4 as shown in (b) of FIG. 3 in order to prevent interference with frequency components of other frequency domains.

A nonlinear processing section (nonlinear processing means) 40 includes the two multipliers 31, 32 and the adder 33. The nonlinear processing section 40 squares (nonlinearly processes) I signal and Q signal of the complex baseband signal. More specifically, the multipliers 31, 32 square the I signal and the Q signal, respectively, and the adder 33 adds the results. As a result of this nonlinear processing, the frequency components ±fs/4 are converted to direct current components and frequency components ±fs/2 as shown in (c) of FIG. 3. The center frequency of pass band of the BPF 34 is ±fs/2 as shown by dashed line in (c) of FIG. 3. The BPF 34 receives the nonlinearly processed signal, extracts the frequency components ±fs/2, and outputs the extracted frequency components as a timing signal.

The frequency components ±fs/2 thus extracted as a timing signal are larger than −fs and smaller than +fs at the sampling frequency 2fs. Therefore, the frequency components ±fs/2 can be extracted by the nonlinear processing without being affected by aliasing distortion components of the frequency components ±fs/2 themselves.

Figure 4:
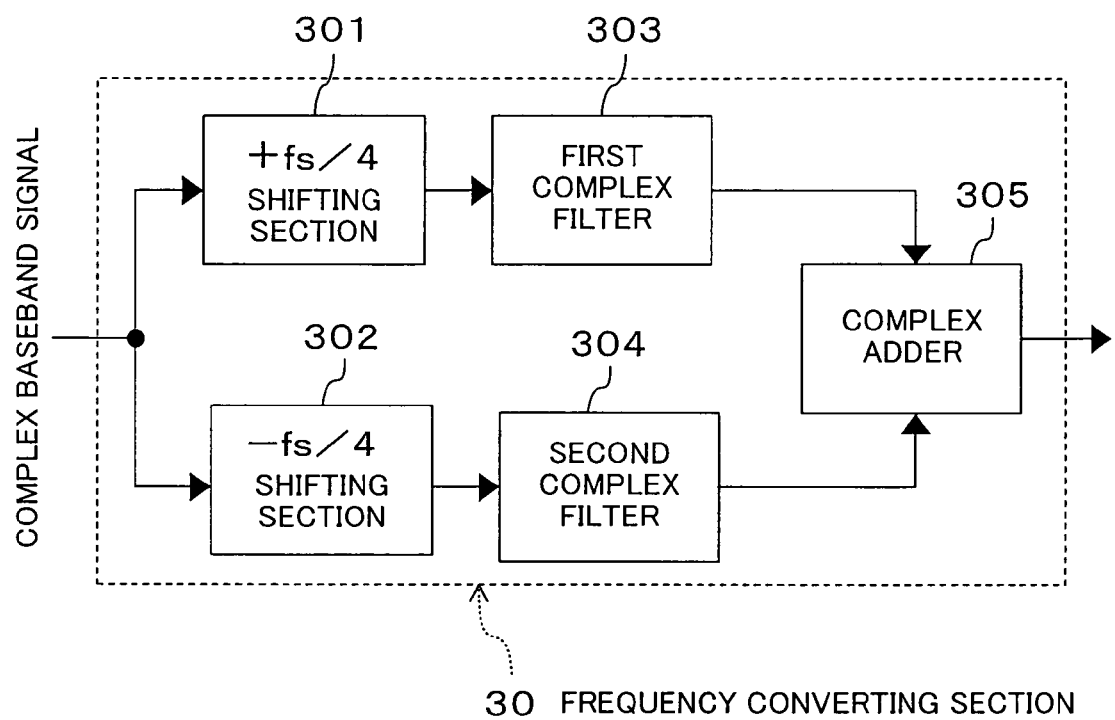
FIG. 4 is a block diagram showing a specific example of the structure of the frequency converting section according to the first embodiment.
Figure 5A:
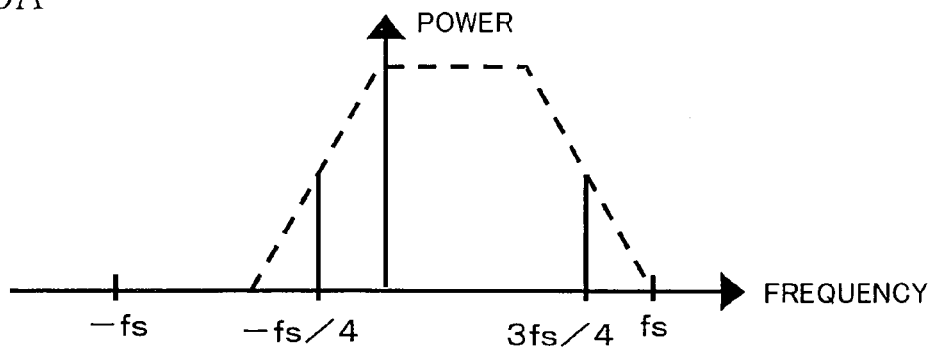
FIG. 5 shows frequency characteristics illustrating operation of the frequency converting section according to the first embodiment, wherein (a) shows a frequency component −fs/2 of a complex baseband signal converted to a frequency position −fs/4, (b) shows a frequency component +fs/2 converted to a frequency position −fs/4, (c) shows frequency characteristics of a first complex filter, and (d) shows frequency characteristics of a second complex filter.
Figure 5B:
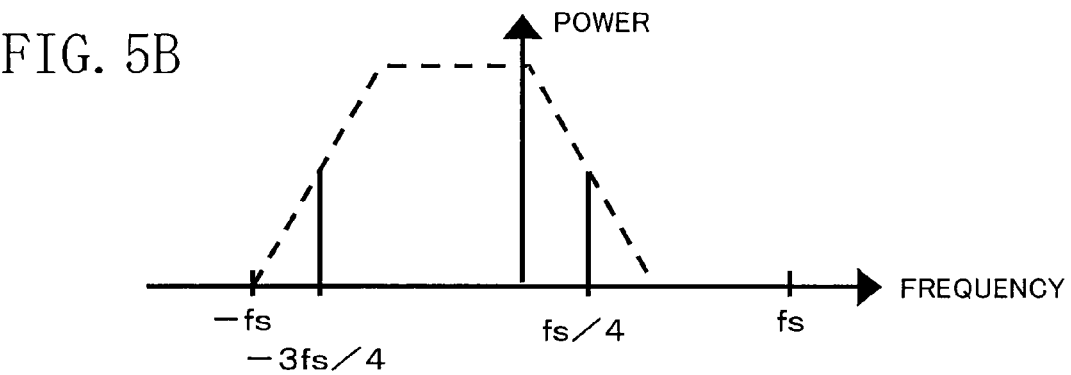
Figure 5C:
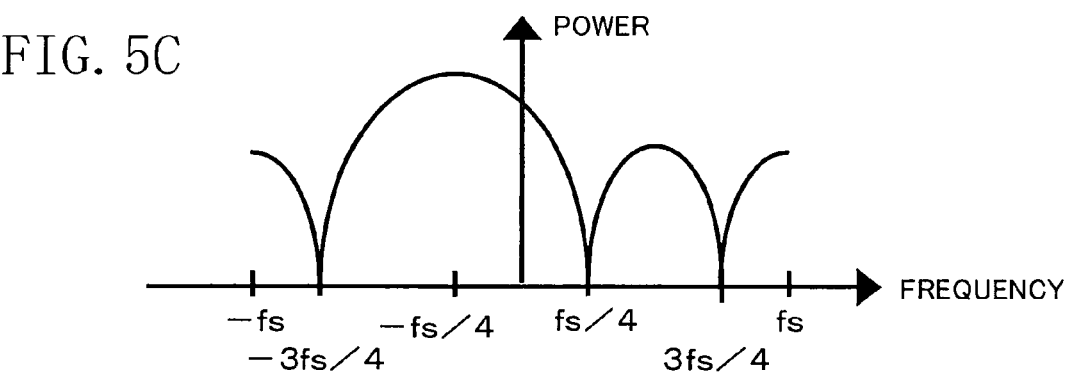
Figure 5D:
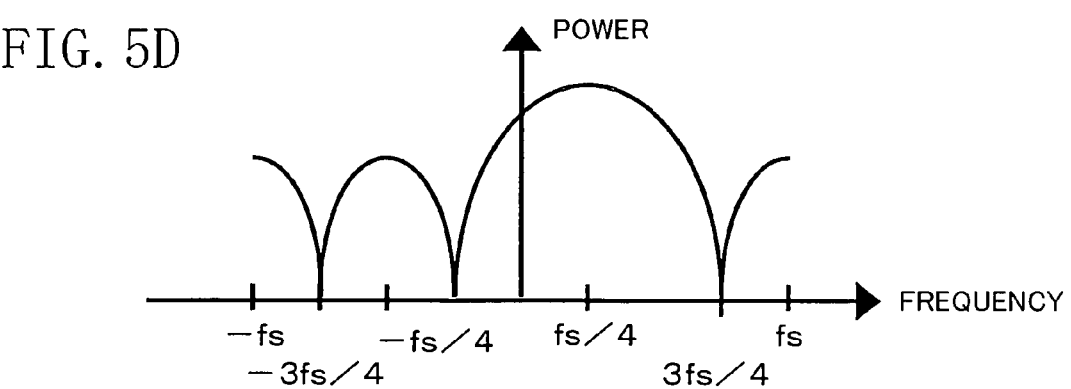

FIG. 4 shows a specific example of the structure of the frequency converting section 30. The frequency converting section 30 includes a +fs/4 shifting section 301, −fs/4 shifting section 302, first and second complex filters (filtering means) 303, 304, and a complex adder 305.

Operation of the frequency converting section 30 will now be described with reference to FIG. 5. The complex baseband signal is applied to the +fs/4 shifting section 301 and the −fs/4 shifting section 302. The +fs/4 shifting section 301 shifts the frequency of the complex baseband signal by +fs/4. In other words, the +fs/4 shifting section 301 converts the frequency component −fs/2 of the complex baseband signal in (a) of FIG. 3 to a frequency position −fs/4 as shown in (a) of FIG. 5, and supplies the resultant signal to the first complex filter 303.

Figure 6:
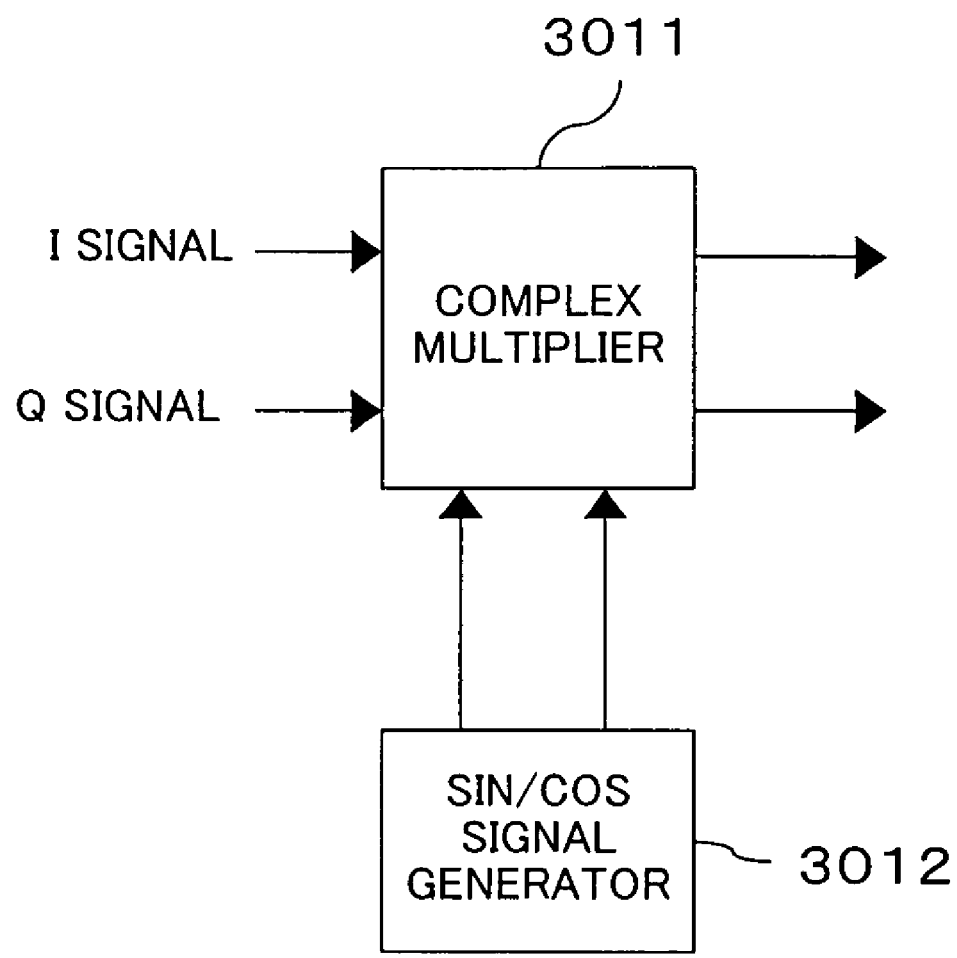
FIG. 6 is a block diagram showing a specific example of the structure of a ±fs/4 shifting section according to the first embodiment.

FIG. 6 shows an example of the internal structure of the +fs/4 shifting section 301.

In FIG. 6, the +fs/4 shifting section 301 includes a complex multiplier 3011 and a sine/cosine signal generator 3012. The sine/cosine signal generator 3012 outputs a rotation vector which rotates by π/4 in a complex plane of I-axis and Q-axis upon every sampling at the sampling clock frequency 2fs. More specifically, the sine/cosine signal generator 3012 sequentially and repeatedly supplies to the complex multiplier 3011 the I and Q signals having the following values: (I, Q)=(1, 0), (1/$\sqrt{2}$, 1/$\sqrt{2}$), (0, 1), (−1/$\sqrt{2}$, 1/$\sqrt{2}$), (−1, 0), (−1/$\sqrt{2}$, −1/$\sqrt{2}$), (0, −1), (1/$\sqrt{2}$, −1/$\sqrt{2}$). The complex multiplier 3011 complex multiplies the complex baseband signal and the output signal of the sine/cosine generator 3012. Frequency shifting by +fs/4 can thus be implemented.

The −fs/4 shifting section 302 shifts the frequency of the complex baseband signal by −fs/4. In other words, the −fs/4 shifting section 302 converts the frequency component +fs/2 of the complex baseband signal to a frequency position +fs/4 as shown in (b) of FIG. 5, and supplies the resultant signal to the second complex filter 304. The −fs/4 shifting section 302 has the same structure as shown in FIG. 6. The sine/cosine signal generator 3012 outputs a rotation vector which rotates by −π/4 in a complex plane of I-axis and Q-axis upon every sampling. More specifically, the sine/cosine signal generator 3012 sequentially and repeatedly supplies to the complex multiplier 3011 the I and Q signals having the following values: (I, Q)=(1, 0), (1/$\sqrt{2}$, −1/$\sqrt{2}$), (0, −1), (−/$\sqrt{2}$, −1/$\sqrt{2}$), (−1, 0), (−1/$\sqrt{2}$, 1/$\sqrt{2}$), (0, 1), (1/$\sqrt{2}$, 1/$\sqrt{2}$). Frequency shifting by −fs/4 can thus be implemented.

The first complex filter 303 of FIG. 4 has the following frequency characteristics: the first complex filter 303 passes at least a frequency component −fs/4 therethrough, blocks a frequency component +fs/4 in order to prevent interference with the frequency component +fs/4 which is the output of the second complex filter 304, and also blocks frequency components ±3fs/4 which will become aliasing distortion components of frequency components ±fs/2 by nonlinear processing in the subsequent stage. The first complex filter 303 filters the complex baseband signal according to these frequency characteristics, and supplies the resultant signal to the complex adder 305. This filtering operation is an operation of passing a frequency −fs/2 and blocking zero frequency and frequency components +fs/2 and ±fs in the complex baseband signal applied to the frequency converting section 30.

Figure 7:
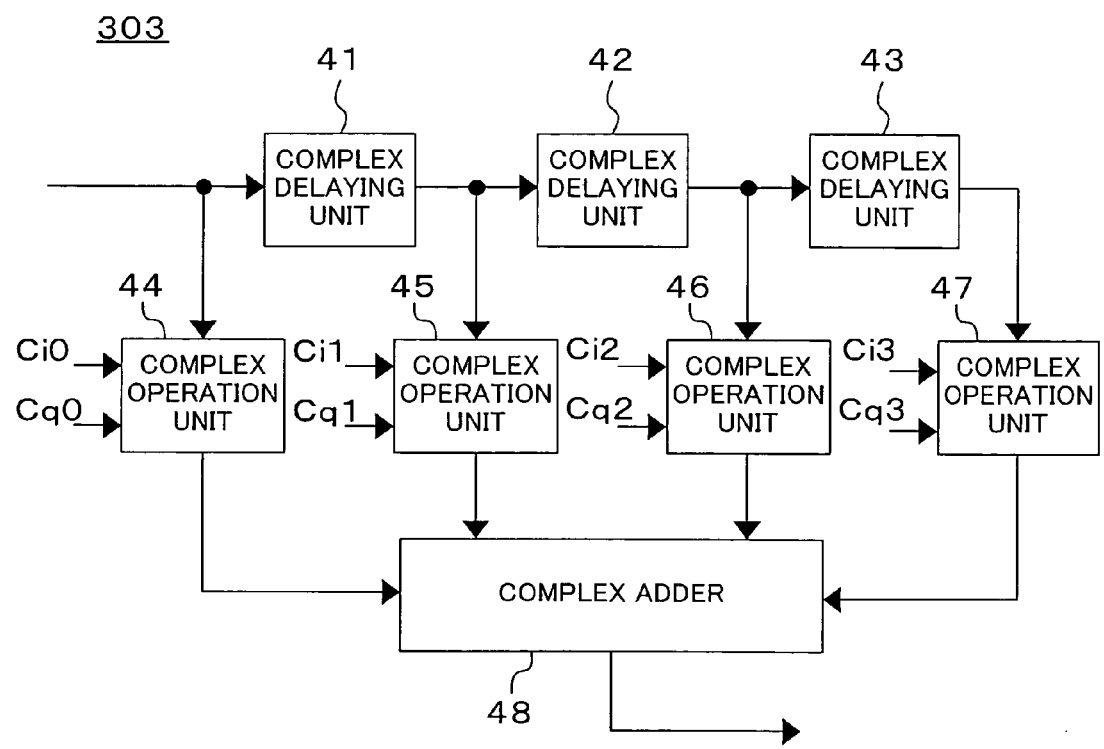
FIG. 7 is a block diagram showing a specific example of the structure of a complex filter according to the first embodiment.

FIG. 7 shows an example of the internal structure of the first complex filter 303. In FIG. 7, the first complex filter 303 includes three complex delaying units 41, 42, 43, four complex operation units 44, 45, 46, 47, and a complex adder 48. The complex delaying units 41 to 43 delay the complex baseband signal according to the sampling clock frequency 2fs. The complex operation units 44 to 47 perform to the complex baseband signal and complex tap coefficients Cim, Cqm (m=0, 1, 2, 3) an operation corresponding to complex multiplication. The complex adder 305 adds the outputs of the complex operation units 44 to 47 and outputs the sum. The frequency characteristics of FIG. 5(c) can be implemented by providing the following complex tap coefficients: (Ci0, Cq0) =(1, 0), (Ci1, Cq1)=(1/$\sqrt{2}$, −1/$\sqrt{2}$), (Ci2, Cq2)=(0, −1), and (Ci3, Cq3)=(−1/$\sqrt{2}$, −1/$\sqrt{2}$).

The second complex filter 304 of FIG. 4 has the following frequency characteristics: the second complex filter 304 passes at least a frequency component +fs/4 therethrough, blocks a frequency component −fs/4 in order to prevent interference with the frequency component −fs/4 which is the output of the first complex filter 303, and also blocks frequency components ±3fs/4 which will become aliasing distortion components of frequency components ±fs/2 by nonlinear processing in the subsequent stage. The second complex filter 304 filters the complex baseband signal according to these frequency characteristics, and supplies the resultant signal to the complex adder 305. This filtering operation is an operation of passing a frequency component +fs/2 and blocking zero frequency and frequency components −fs/2 and ±fs in the complex baseband signal applied to the frequency converting section 30. For example, the second complex filter 304 has the internal structure of FIG. 7, and the frequency characteristics in (d) of FIG. 5 can be implemented by providing the following tap coefficients: (Ci0, Cq0)=(1, 0), (Ci1, Cq1)=(1/$\sqrt{2}$, 1/$\sqrt{2}$), (Ci2, Cq2)=(0, 1), and (Ci3, Cq3)= (−1/$\sqrt{2}$, 1/$\sqrt{2}$).

The complex adder 305 of FIG. 4 complex adds the complex baseband signals obtained by the above processing. The complex adder 305 thus outputs the complex baseband signal having the frequency components ±fs/2 of the digital modulated wave converted to the frequency positions ±fs/4 in order to prevent interference with frequency components of other frequency domains.

Referring back to FIG. 2, the multipliers 31, 32 of the nonlinear processing section 40 respectively square the I and Q signals of the complex baseband signal received from the complex adder 305 of the frequency converting section 30 of FIG. 4, and outputs the resultant I and Q signals. The adder 33 adds the resultant I and Q signals and supplies the sum to the BPF 34.

The operation of obtaining the sum of squares in the nonlinear processing section 40 is a conventional nonlinear processing method. More specifically, this operation cancels the influences of the fact that the phases of zero degree and 180 degrees of the frequency components become indeterminate due to change of symbol and the influences of a carrier frequency offset. Moreover, the present embodiment cancels a frequency offset which is generated in the +fs/4 shifting section 301 and the −fs/4 shifting section 302 in the frequency converting section 30 of FIG. 4 due to the sampling frequency lag and time lag.

The BPF 34 of FIG. 2 extracts the frequency components ±fs/2 from the signal received from the adder 33 of the nonlinear processing section 40, and outputs the extracted frequency components to the timing error detector 21 of FIG. 1 as a timing signal.

Figure 8A:
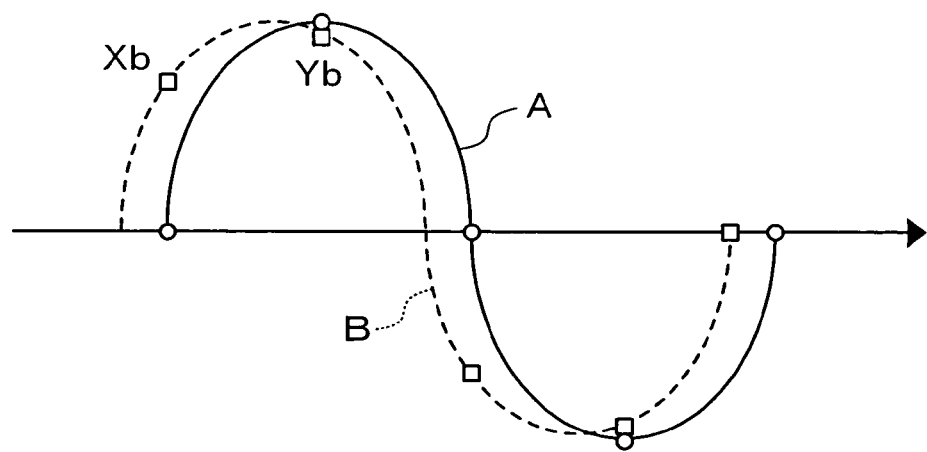
FIG. 8 is waveform diagrams showing the relation between a timing signal and sample points, where (a) shows a waveform obtained when the sampling timing is late and (b) shows a waveform obtained when the sampling timing is early.
Figure 8B:
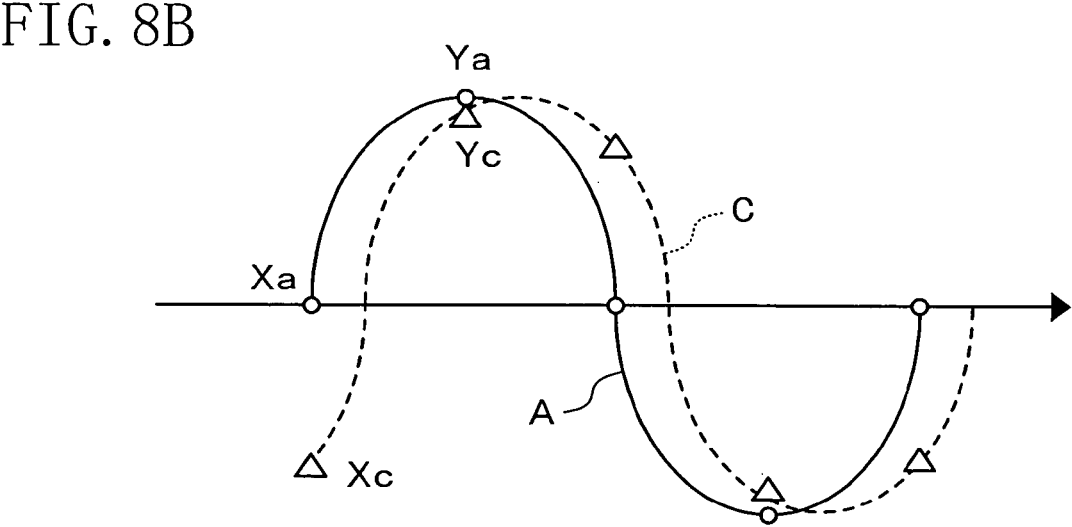

FIG. 8 shows waveform diagrams showing the relation between a timing waveform and sample points. Curve A in (a) and (b) of FIG. 8 shows a waveform obtained when the sampling timing is correct, curve B in (a) of FIG. 8 shows a waveform obtained when the sampling timing is late, and curve C in (b) of FIG. 8 shows a waveform obtained when the sampling timing is early. For example, the timing error detector 21 detects the timing difference of a sample point by obtaining φ=Tan$^{-1}$(X/Y) from the values of the points X and Y. The timing error detector 21 then outputs the detected timing difference to the loop filter 22 as a timing error signal.

Figure 17:
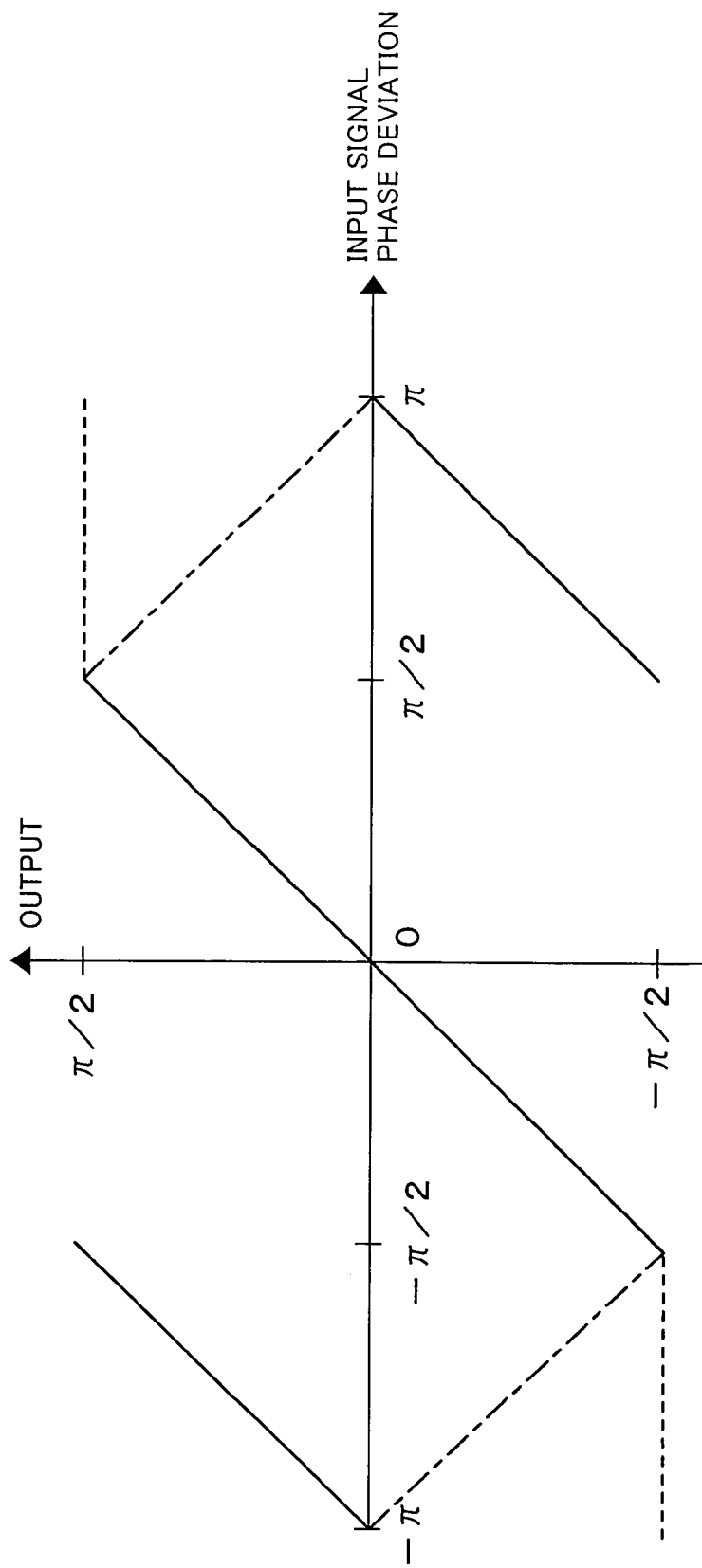
FIG. 17 shows input/output characteristics showing a specific example of an error function of a timing error detector.

FIG. 17 shows an error function of the timing error detector 21. In FIG. 17, solid line shows the relation between an input phase of a timing signal and φ=Tan$^{-1}$(X/Y). It can be seen from FIG. 17 that there are zero crossing points at the input phase of zero and +π. Pseudosynchronization occurs when the input phase converges to +π or −π. In order to prevent such pseudosynchronization, the timing error detector 21 includes, e.g., a counter for counting four samples as a pseudosynchronization preventing means. The timing error detector 21 analyzes the timing signal by using four samples of the sampling clock frequency 2fs as one cycle. The timing error detector 21 thus produces such characteristics as shown by dashed line or chain dotted line in the figure when the input phase is in the range of π/2 to π and −π/2 to −π. Note that it is desirable that the initial phase of the rotation vector (zero to 2π) used in the +fs/4 shifting section 301 and the −fs/4 shifting section 302 of the frequency converting section 30 of FIG. 4 is zero and the data point at the time the rotation vector is zero or π is used as a reference point of the four samples.

Another method for preventing pseudosynchronization uses a signal quality detecting means such as a BER measuring unit and a C/N detector. Pseudosynchronization is determined to have occurred if the signal quality is poor after a timing control loop converged. In this case, the output signal of the rate converter 109 is controlled so that the timing signal is shifted by π or −π.

The loop filter 22 in the timing control section 110 of FIG. 1 smoothes the timing error signal received from the timing error detector 21, and outputs the resultant signal to the rate converter 109 as a timing control signal 110a.

As has been described above, the structure of the present embodiment enables stable timing extraction at the sampling clock frequency 2fs without being affected by a carrier frequency offset.

Note that, in the present embodiment, the frequency converting section 30 converts the frequency component +fs/2 of the complex baseband signal to the frequency position +fs/4 and converts the frequency component −fs/2 to the frequency position −fs/4. However, the present invention is not limited to this. For example, the same effects can be obtained even when the frequency converting section 30 converts the frequency components to the opposite frequency positions in order to prevent interference between frequency components. In other words, the frequency converting section 30 may convert the frequency component +fs/2 to the frequency position −fs/4 and convert the frequency component −fs/2 to the frequency position +fs/4.

SECOND EMBODIMENT

Hereinafter, the second embodiment of the present invention will be described with reference to FIGS. 9 and 10.

The overall structure of the present embodiment is the same as that shown in FIGS. 1 and 2 except the structure of the frequency converting section 30. FIG. 9 shows the structure of the frequency converting section 30 of the present embodiment. Note that, in FIG. 9, the same portions as those of FIG. 4 are denoted with the same reference numerals and description thereof will be omitted. The portions different from those of FIG. 4 will be mainly described below.

Figure 9:
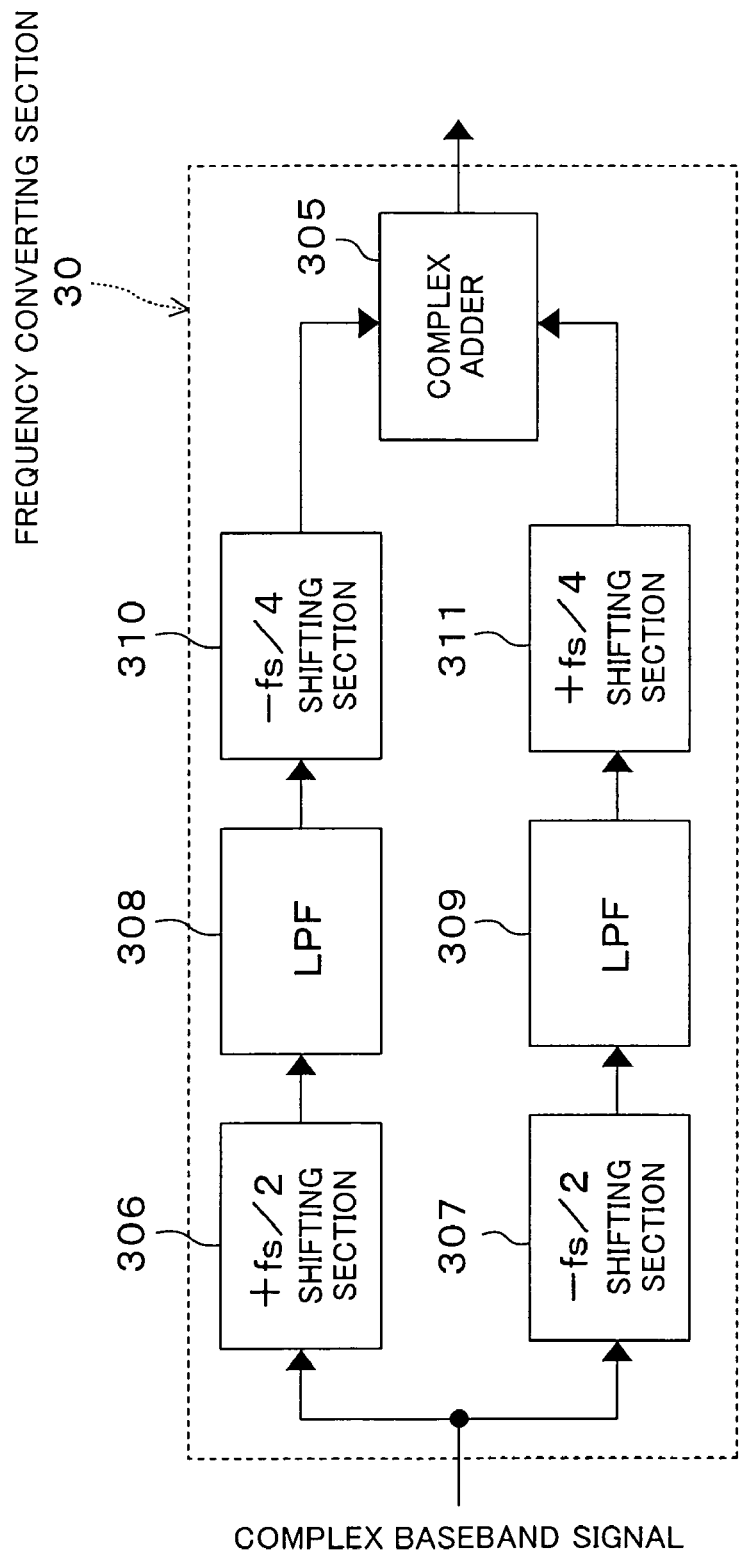
FIG. 9 is a block diagram showing a specific example of the structure of a frequency converting section according to a second embodiment.
Figure 10A:
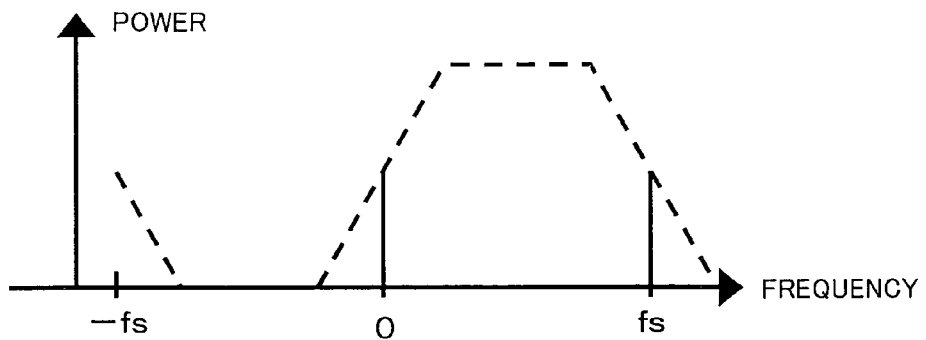
FIG. 10 shows frequency characteristics illustrating operation of the frequency converting section according to the second embodiment, where (a) shows a frequency component −fs/2 of a complex baseband signal converted to the zero frequency position, (b) shows a frequency component +fs/2 converted to the zero frequency position, (c) shows frequency characteristics of a LPF, and (d) shows other frequency characteristics of the LPF.
Figure 10B:
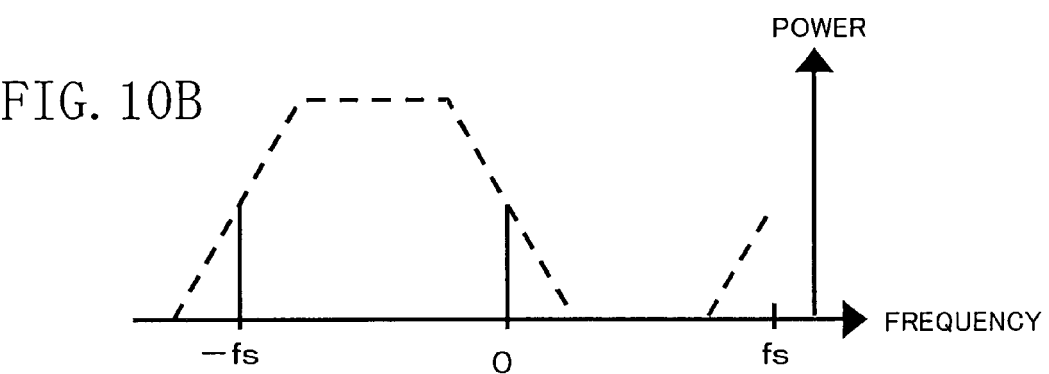
Figure 10C:
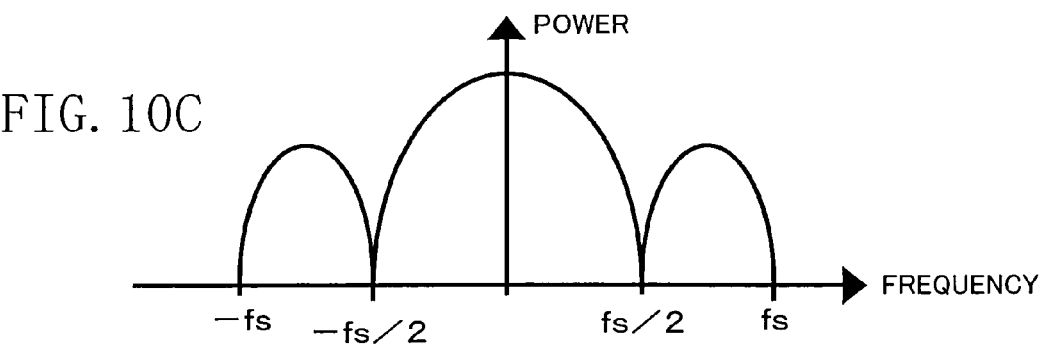
Figure 10D:
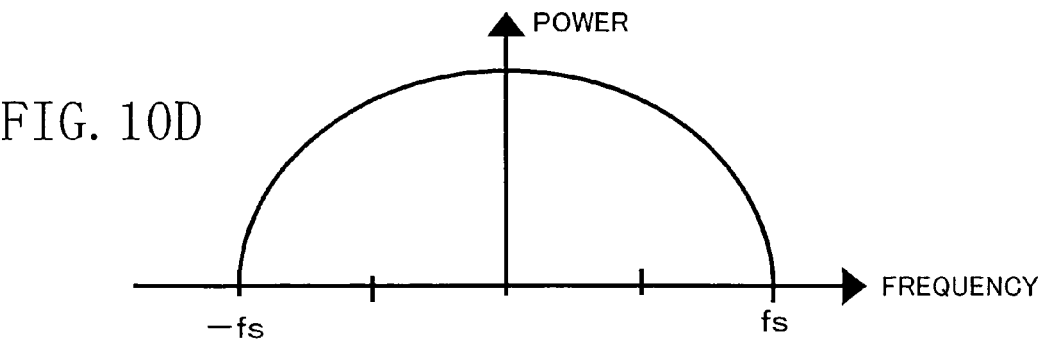

In FIG. 9, a complex baseband signal is applied to a +fs/2 shifting section (first frequency shifting means) 306 for shifting the frequency by +fs/2 in the frequency increasing direction and a −fs/2 shifting section (second frequency shifting means) 307 for shifting the frequency by −fs/2 in the frequency decreasing direction. The +fs/2 shifting section 306 shifts the frequency of the complex baseband signal by +fs/2. The +fs/2 shifting section 306 thus converts the frequency component −fs/2 of the complex baseband signal in (a) of FIG. 3 to the zero frequency position as shown in (a) of FIG. 10, and supplies the resultant signal to an LPF 308. On the other hand, the −fs/2 shifting section 307 shifts the frequency of the complex baseband signal by −fs/2. The −fs/2 shifting section 307 thus converts the frequency component +fs/2 of the complex baseband signal to the zero frequency position as shown in (b) of FIG. 10, and supplies the resultant signal to an LPF 309.

The LPFs 308, 309 are the filters having the following frequency characteristics: the LPFs 308, 309 pass zero frequency therethrough and block the frequency components ±fs/2 and ±fs as shown in (c) of FIG. 10. The LPFs 308, 309 filter the complex baseband signal according to these frequency characteristics, and supply the resultant signal to a −fs/4 shifting section (second frequency shifting means) 310 and a +fs/4 shifting section (first frequency shifting means) 311, respectively.

Since the LPFs 308, 309 have the same frequency characteristics, these LPFs have the same structure. Since the frequency characteristics of the LPFs are positive-and-negative symmetric with respect to zero frequency, each LPF 308, 309 can conduct the same, independent filtering operation to the I signal and the Q signal.

The filtering operation of the LPF 308 is an operation of passing the frequency component −fs/2 therethrough and blocking zero frequency and the frequency components +fs/2 and ±1fs in the complex baseband signal applied to the frequency converting section 30. The filtering operation of the LPF 309 is an operation of passing the frequency component +fs/2 therethrough and blocking zero frequency and the frequency components −fs/2 and ±fs in the complex baseband signal applied to the frequency converting section 30.

In FIG. 9, the −fs/4 shifting section 310 shifts a zero frequency component to the frequency position −fs/4, shifts a null frequency component of fs to the frequency position 3fs/4, and shifts a null frequency component of fs/2 to the frequency position fs/4. On the other hand, the +fs/4 shifting section 311 shifts a zero frequency component to the frequency position fs/4, shifts a null frequency component of −fs to the frequency position −3fs/4, and shifts a null frequency component −fs/2 to the frequency position −fs/4.

The complex adder 305 complex adds the respective outputs of the −fs/4 shifting section 310 and the +fs/4 shifting section 311. The complex adder 305 thus outputs the complex baseband signal having the frequency components ±fs/2 of the digital modulated wave converted to the frequency positions ±fs/4 in order to prevent interference with frequency components of other frequency domains, and having as null frequency components the frequency components ±3fs/4 which will become aliasing distortion components of the frequency components ±fs/4 by the nonlinear processing in the subsequent stage.

As has been described above, according to the present embodiment, the two LPFs 308, 309 have the same structure, and each of the LPFs 308, 309 has the same, independent filtering structure on its I side and Q side. This simplifies the circuitry. Other specific effects are the same as those of the first embodiment.

It should be understood that, like the first embodiment, the same effects can be obtained even when the frequency converting section 30 converts the frequency components ±fs/2 of the complex baseband signal to the opposite frequency positions ±fs/4 in order to prevent interference between frequency components.

THIRD EMBODIMENT

The third embodiment of the present invention will now be described with reference to FIGS. 10 and 11.

The overall structure of the present embodiment is the same as that shown in FIGS. 1 and 2 except the structure of the frequency converting section 30. FIG. 11 shows the structure of the frequency converting section 30 of the present embodiment. Note that, in FIG. 11, the same portions as those of FIGS. 4 and 9 are denoted with the same reference numerals, and description thereof will be omitted.

Figure 11:
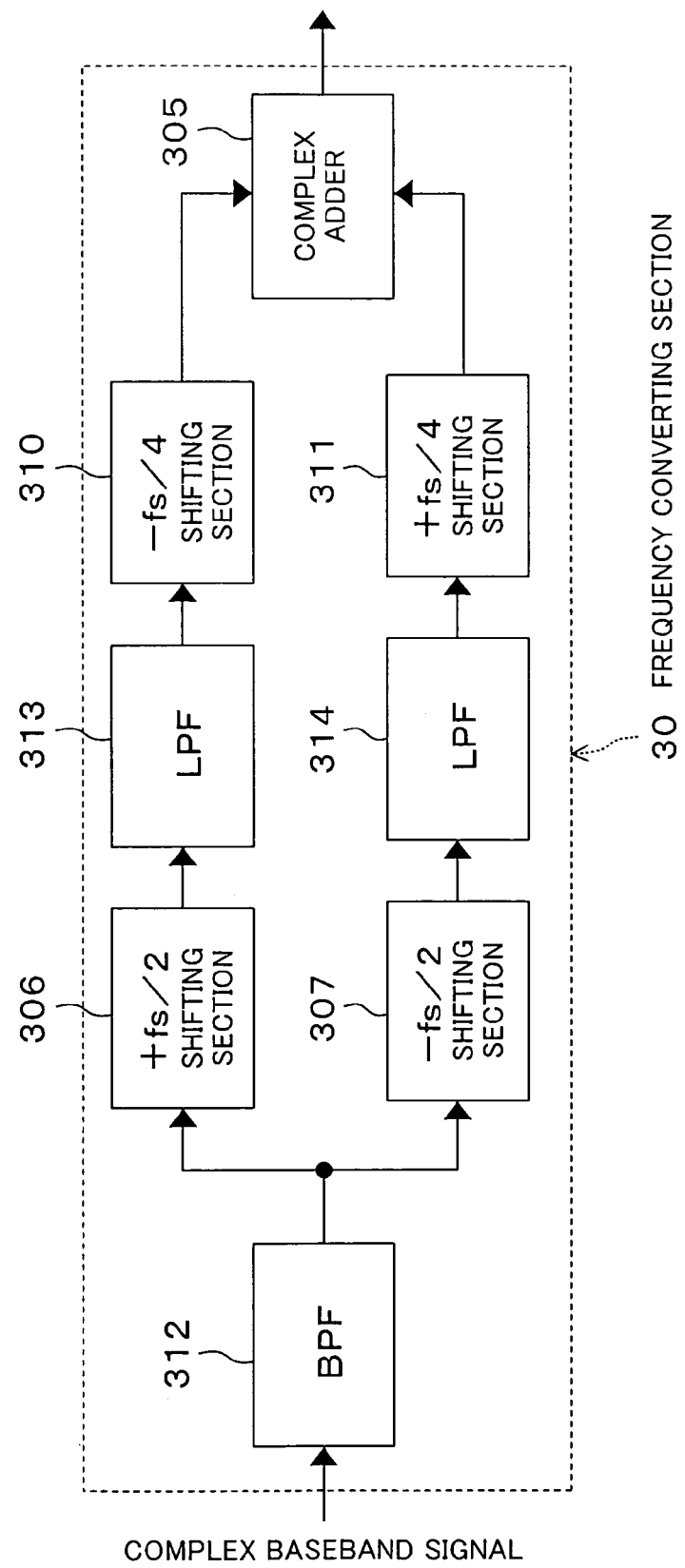
FIG. 11 is a block diagram showing a specific example of the structure of a frequency converting section according to a third embodiment.

In FIG. 11, a complex baseband signal is applied to a BPF (bandpass filtering means) 312. The center frequency of pass band of the BPF 312 is ±fs/2. The BPF 312 receives the complex baseband signal, extracts the frequency components ±fs/2, and outputs the extracted frequency components to a +fs/2 shifting section 306 and a −fs/2 shifting section 307.

The +fs/2 shifting section 306 shifts the frequency of the complex baseband signal by +fs/2. The +fs/2 shifting section 306 thus converts the frequency component −fs/2 to the zero frequency position, converts the frequency component +fs/2 to the frequency position fs, and outputs the resultant signal to an LPF 313. On the other hand, the −fs/2 shifting section 307 shifts the frequency of the complex baseband signal by −fs/2. The −fs/2 shifting section 307 thus converts the frequency component +fs/2 to the zero frequency position, converts the frequency component −fs/2 to the frequency position −fs, and outputs the resultant signal to an LPF 309.

The LPFs 313, 314 are the filters having such frequency characteristics that the LPFs 313, 314 pass zero frequency therethrough and block the frequency components 35 fs as shown in (d) of FIG. 10. The LPFs 313, 314 filter the complex baseband signal according to these frequency characteristics, and supply the resultant signal to a −fs/4 shifting section 310 and a +fs/4 shifting section 311, respectively.

The −fs/4 shifting section 310 shifts a zero frequency component to the frequency position −fs/4, and shifts a null frequency component of fs to the frequency position 3fs/4. On the other hand, the +fs/4 shifting section 311 shifts a zero frequency component to the frequency position fs/4, and shifts a null frequency component of −fs to the frequency position −3fs/4.

A complex adder 305 complex adds the respective outputs of the −fs/4 shifting section 310 and the fs/4 shifting section 311. The complex adder 305 thus outputs the complex baseband signal having the frequency components ±fs/2 of the digital modulated wave converted to the frequency positions ±fs/4 in order to prevent interference with frequency components of other frequency domains, and having as null frequency components the frequency components ±3fs/4 which will become aliasing distortion components of the frequency components ±fs/4 by the nonlinear processing in the subsequent stage.

As has been described above, according to the present embodiment, the BPF 312 extracts the frequency components ±fs/2. Therefore, unnecessary frequency signal components can be removed in advance, thereby stabilizing timing extraction. Other specific effects are the same as those of the first embodiment.

It should be understood that replacing the frequency characteristics of the two LPFs 313, 314 with the frequency characteristics of the LPFs 308, 309 shown in (c) of FIG. 10 enables further removal of aliasing distortion components of the sampling theorem, thereby further stabilizing timing extraction.

It should also be understood that, like the first embodiment, the same effects can be obtained even when the frequency converting section 30 converts the frequency components ±fs/2 of the complex baseband signal to the opposite frequency positions ±fs/4 in order to prevent interference between frequency components.

FOURTH EMBODIMENT

The fourth embodiment of the present invention will now be described with reference to FIGS. 12 and 13.

The overall structure of the present embodiment is the same as that of FIG. 1 except the structure of the timing extracting section 20 of FIG. 2. FIG. 12 shows the structure of the timing extracting section 20 of the present embodiment.

Figure 12:
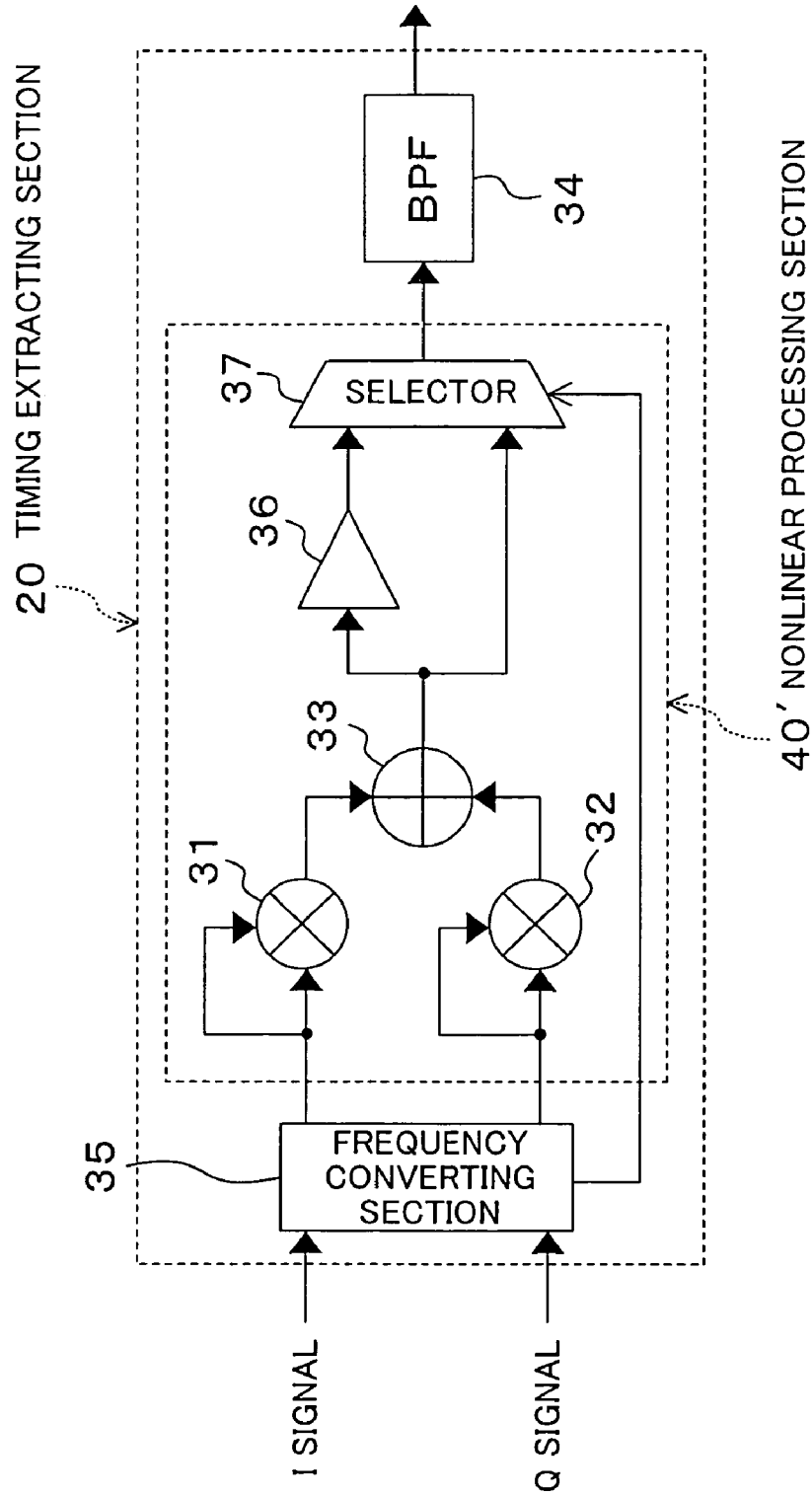
FIG. 12 is a block diagram showing a specific example of the structure of a timing extracting section according to a fourth embodiment.

The timing extracting section 20 of FIG. 12 has the same input/output signals as the first to third embodiments described above, but is different from the first to third embodiments in that the frequency converting section 30 is replaced with a frequency converting section 35, and that a nonlinear processing section 40' has a bit shifter (bit shifting means) 36 and a selector (selecting means) 37 inserted after the adder 33. Note that, in FIG. 12, the same portions as those of FIG. 2 are denoted with the same reference numerals, and description thereof will be omitted.

Figure 13:
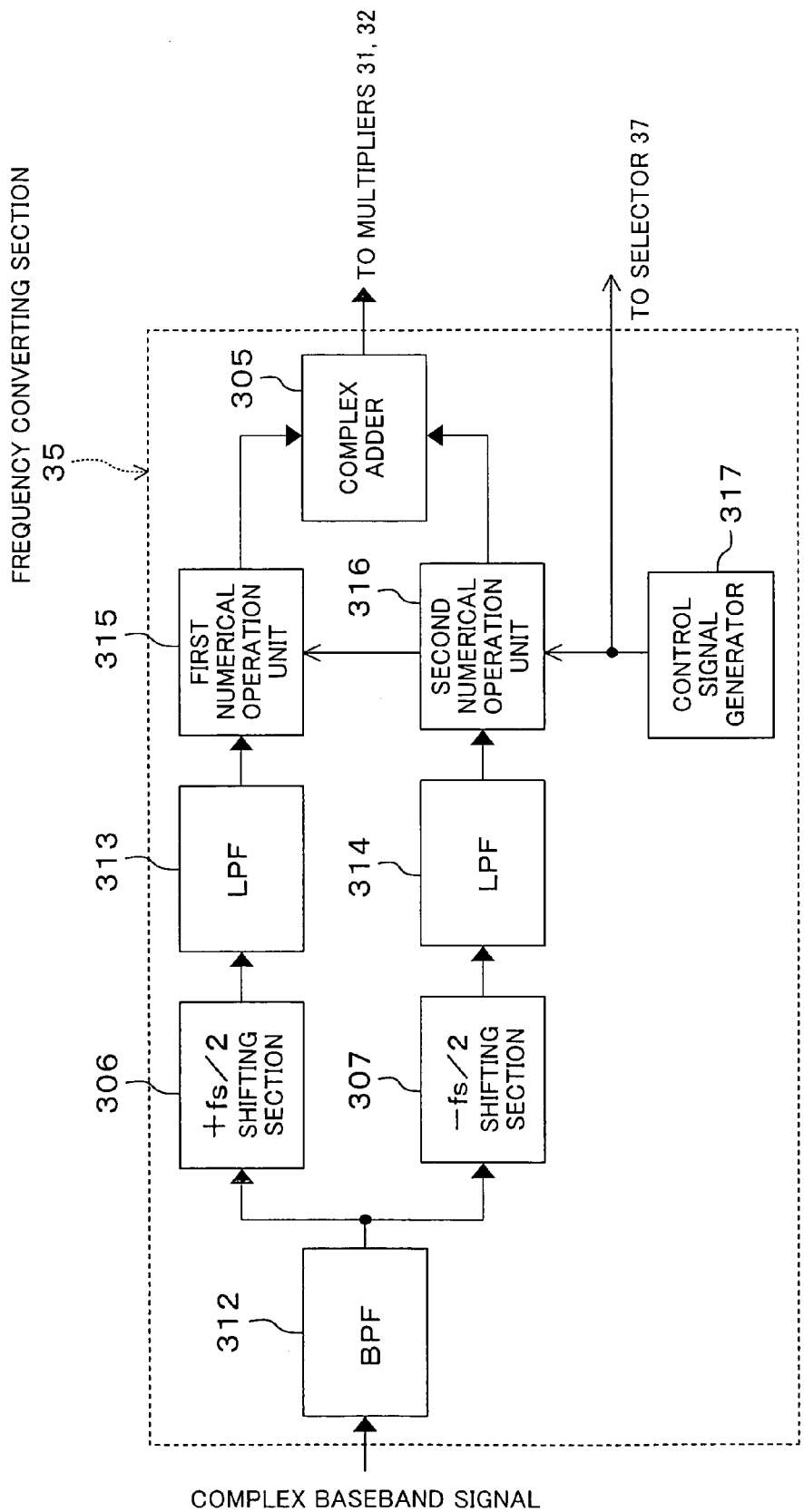
FIG. 13 is a block diagram showing a specific example of the structure of a frequency converting section according to the fourth embodiment.

FIG. 13 shows the structure of the frequency converting section 35. The frequency converting section 35 of FIG. 13 is slightly different in structure from the frequency converting section 30 of FIG. 11. In FIG. 13, the same portions as those of FIG. 11 are denoted with the same reference numerals, and the portions different from FIG. 11 will be described below.

In FIG. 13, a first numerical operation unit (numerical operation means) 315 receives a complex baseband signal from the LPF 313. The first numerical operation unit 315 sequentially and repeatedly complex multiplies the complex baseband signal by the I and Q signals of the following values in a complex plane of I axis and Q axis: (I, Q)=(1, 0), $(1/\sqrt{2}, -1/\sqrt{2})$, (0, −1), $(-1/\sqrt{2}, -1/\sqrt{2})$, (−1, 0), $(-1/\sqrt{2}, 1/\sqrt{2})$, (0, 1), $(1/\sqrt{2}, 1/\sqrt{2})$, and then complex multiplies only components having the value $1/\sqrt{2}$ of the I and Q signals of the resultant signal by $\sqrt{2}$. In other words, the first numerical operation unit 315 sequentially and repeatedly complex multiplies the complex baseband signal by the I and Q signals of the following values in the complex plane: (I, Q)=(1, 0), (1, −1), (0, −1), (−1, −1), (−1, 0), (−1, 1), (0, 1), (1, 1).

On the other hand, a second numerical operation unit (numerical operation means) 316 complex multiplies a complex baseband signal from the LPF 314 by I and Q signals having only components with the value $1/\sqrt{2}$ multiplied by $\sqrt{2}$, rather than sequentially and repeatedly complex multiplying the complex baseband signal by the I and Q signals of the following values in a complex plane of I axis and Q axis: (I, Q)=(1, 0), $(1/\sqrt{2}, 1/\sqrt{2})$, (0, 1), $(-1/\sqrt{2}, 1/\sqrt{2})$, (−1, 0), $(-1/\sqrt{2}, -1/\sqrt{2})$, (0, −1), $(1/\sqrt{2}, -1/\sqrt{2})$. In other words, the second numerical operation unit 316 sequentially and repeatedly complex multiplies the complex baseband signal by the I and Q signals of the following values in the complex plane: (I, Q)=(1, 0), (1, 1), (0, 1), (−1, 1), (−1, 0), (−1, −1), (0, −1), (1, −1).

A control signal generator 317 of FIG. 13 is used to synchronize the operation timing of the values multiplied by $\sqrt{2}$ between the first numerical operation unit 315 and the second numerical operation unit 316. For example, according to the control signal generator 317, provided that A(n) is a value to be complex multiplied for the $n^{th}$ sample in the first numerical operation unit 315 and B(n) is a value to be complex multiplied for the $n^{th}$ sample in the second numerical operation unit 316, A(n)=(1, 0), A(n+1)=(1, −1), A(n+2)=(0, −1), A(n+3)=(−1, −1), A(n+4)=(−1, 0), A(n+5)=(−1, 1), A(n+6)=(0, 1), A(n+7)=(1, 1), and B(n)=(1, 0), B(n+1)=(1, 1), B(n+2)=(0, 1), B(n+3)=(−1, 1), B(n+4)=(−1, 0), B(n+5)=(−1, −1), B(n+6)=(0, −1), B(n+7)=(1, −1).

This complex multiplication of the values and the complex baseband signal can be implemented by a selector, sign inversion, an adder and the like without using complex multiplication.

Squaring a value multiplied by $\sqrt{2}$ equals two. In other words, an original signal can be obtained by squaring the signal multiplied by $\sqrt{2}$ in the frequency converting section 35 and then multiplying the squared signal by ½. As shown in FIG. 12, in the nonlinear processing section 40', the input signal is squared, and then multiplied by ½ in the bit shifter 36. The output of the bit shifter 36 or the output of the adder 33 is selected based on the timing of the control signal generator 317. More specifically, the output signal of the bit shifter 36 is selected at the timing of the signals multiplied by $\sqrt{2}$, and the output of the adder 33 is selected at the timing of other signals. In this way, the same output as the timing extracting section 20 of FIG. 2 can be obtained.

As has been described above, according to the present embodiment, a signal squared and then multiplied by ½ or an output signal having a normal value is selected based on the control signal. By using this structure, the operation to be performed by a complex multiplier can be implemented only by the adder 33, the bit shifter 36 and the selector 37. This enables reduction in circuit scale.

Other specific effects are the same as those of the first embodiment. It should be understood that, like the first embodiment, the same effects can be obtained even when the frequency converting section 35 converts the frequency components ±fs/2 of the complex baseband signal to the opposite frequency positions ±fs/4 in order to prevent interference between frequency components.

FIFTH EMBODIMENT

The fifth embodiment of the present invention will now be described with reference to FIGS. 14 and 15.

The overall structure of the present embodiment is the same as that of FIG. 1 except the structure of the timing extracting section 20 of FIG. 2. FIG. 14 shows the structure of the timing extracting section 20 of the present embodiment.

Figure 14:
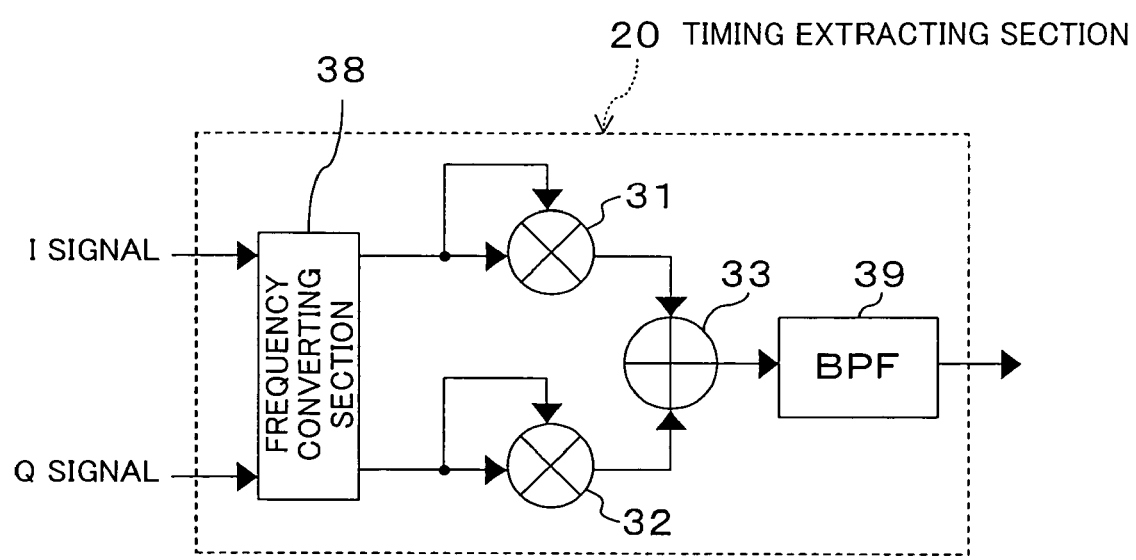
FIG. 14 is a block diagram showing a specific example of the structure of a timing extracting section according to a fifth embodiment.

The timing extracting section 20 of FIG. 14 has the same input signals as the first embodiment of FIG. 2, but is different from the first embodiment in that the frequency converting section 30 is replaced with a frequency converting section 38, and that the BPF 34 of FIG. 12 is replaced with a BPF 39 having a center frequency of pass band of ±fs/4. Note that, in FIG. 14, the same portions as those of FIG. 2 are denoted with the same reference numerals, and description thereof will be omitted.

Figure 15:
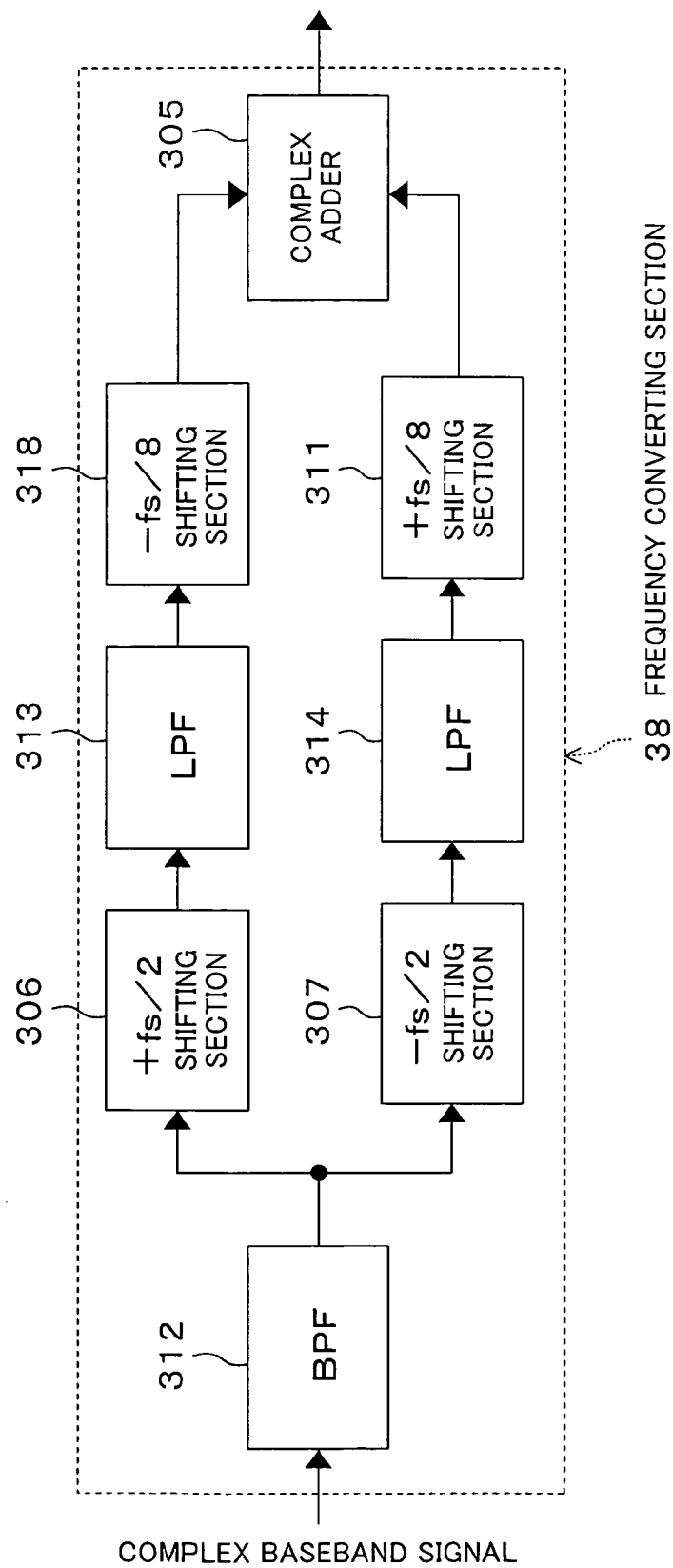
FIG. 15 is a block diagram showing a specific example of the structure of a frequency converting section according to the fifth embodiment.

FIG. 15 shows the structure of the frequency converting section 38. The frequency converting section 38 is different from the frequency converting section 30 of FIG. 11 in that the −fs/4 shifting section 310 is replaced with a −fs/8 shifting section 318 and that the +fs/4 shifting section 311 is replaced with a +fs/81 shifting section 319. In FIG. 15, the same portions as those of FIG. 11 are denoted with the same reference numerals, and only the different portions will be described below.

The −fs/8 shifting section 318 of FIG. 15 shifts a frequency component produced with a change of a symbol located at the zero frequency position to the frequency position −fs/8. On the other hand, the +fs/8 shifting section 319 shifts a frequency component produced with a change of a symbol located at the zero frequency position to the frequency position fs/8.

A complex adder 305 complex adds the respective outputs of the −fs/8 shifting section 318 and the +fs/8 shifting section 319. The complex adder 305 thus outputs a complex baseband signal having as null frequency components the frequency components ±7fs/8 which will become aliasing distortion components of the frequency components ±fs/4 by the nonlinear processing in the subsequent stage, without causing interference by the frequency components ±fs/8.

The two multipliers 31, 32 of FIG. 14 respectively square the I and Q signals of the complex baseband signal received from the complex adder 305 of the frequency converting section 38. The adder 33 adds the squared I and Q signals. This nonlinear processing converts the frequency components ±fs/8 of the input signal to the zero frequency position and the frequency positions ±fs/4. The BPF 39 extracts the frequency components ±fs/4 and outputs the extracted frequency components as a timing signal.

Figure 16:
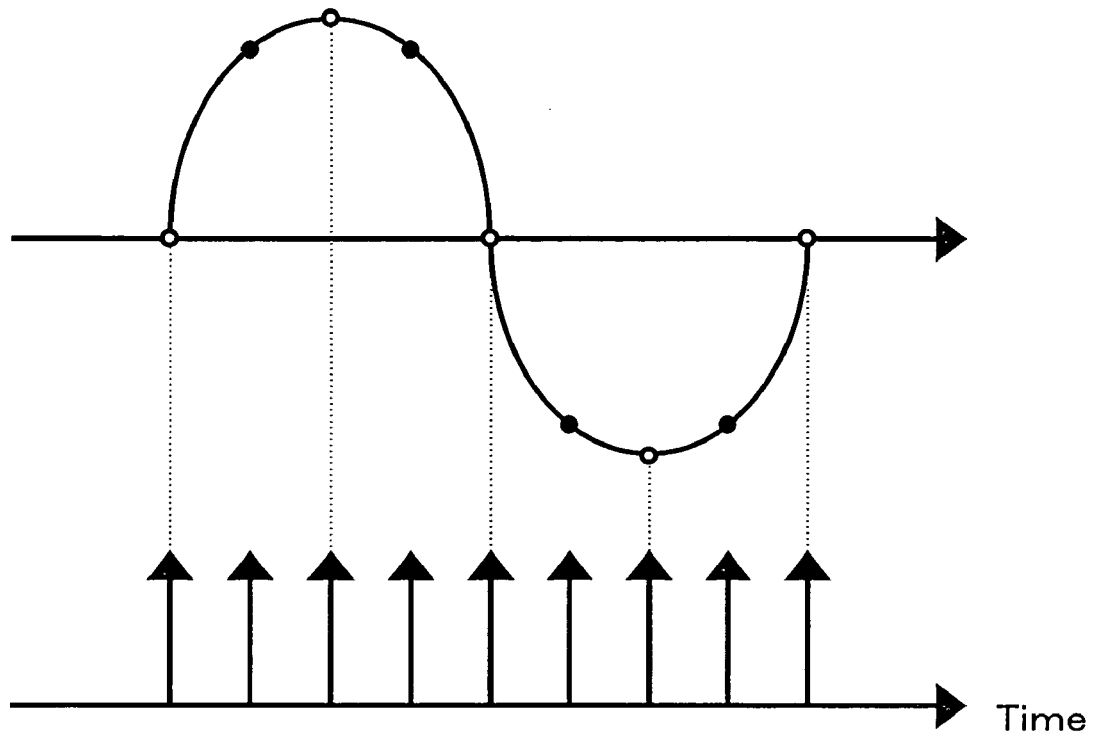
FIG. 16 is a waveform diagram showing the relation between a timing output signal of the timing extracting section according to the fifth embodiment and sample points.

FIG. 16 is a waveform showing the relation between the timing signal and sample intervals. In the first to fourth embodiments, the timing signal is represented by four sampling points in each cycle of the sine wave, as shown in FIG. 8. In the present embodiment, however, the timing signal is represented by eight sampling points in each cycle of the sine wave, as shown in FIG. 16. For example, by outputting as a timing signal the signal with the sample data of black circles in the figure removed (alternate sample data), the timing error detector 22 and the loop filter 22 in the subsequent stage need only operate based on this thinned-out timing signal. This enables reduction in operation amount per unit time.

As has been described above, according to the present embodiment, the output data of the BPF 39 can be thinned out, thereby enabling reduction in operation amount per unit time of the timing error detector 22 and the loop filter 23 of the subsequent stage. Other specific effects are the same as those of the first embodiment.

It should be understood that, like the first embodiment, the same effects can be obtained even when the frequency converting section 38 converts the frequency components ±fs/2 of the complex baseband signal to the opposite frequency positions ±fs/8 in order to prevent interference between the frequency components.

In the present embodiment, the frequency components ±fs/2 of the complex baseband signal applied to the timing extracting section 20 are converted to the frequency positions ±fs/8, and the frequency components ±fs/4 are extracted after nonlinear processing. However, the present invention is not limited to this. It should be understood that the same effects as those of the first embodiment can be obtained even when the frequency components ±fs/2 are converted to frequency positions ±fs/2M (where M is an integer of three or more) and frequency components ±fs/M are extracted after nonlinear processing. The integer M may not be used. The frequency components ±fs/2 included in the complex baseband signal need only be converted to a frequency position fm (0<|fm|<fs/2) so that the frequency components ±fs/2 do not interfere with other frequency components.

By converting the frequency components ±fs/2 to frequency positions ±fs/($2^2$×L), extracting frequency components ±fs/(2×L) after nonlinear processing (where L is an integer of three or more), and outputting the data once every L times to the timing error detector 22, the operation amount of the timing error detector 22 and the loop filter 23 in the subsequent stage can further be reduced.

SIXTH EMBODIMENT

The sixth embodiment of the present invention will now be described with reference to FIG. 18.

Figure 18:
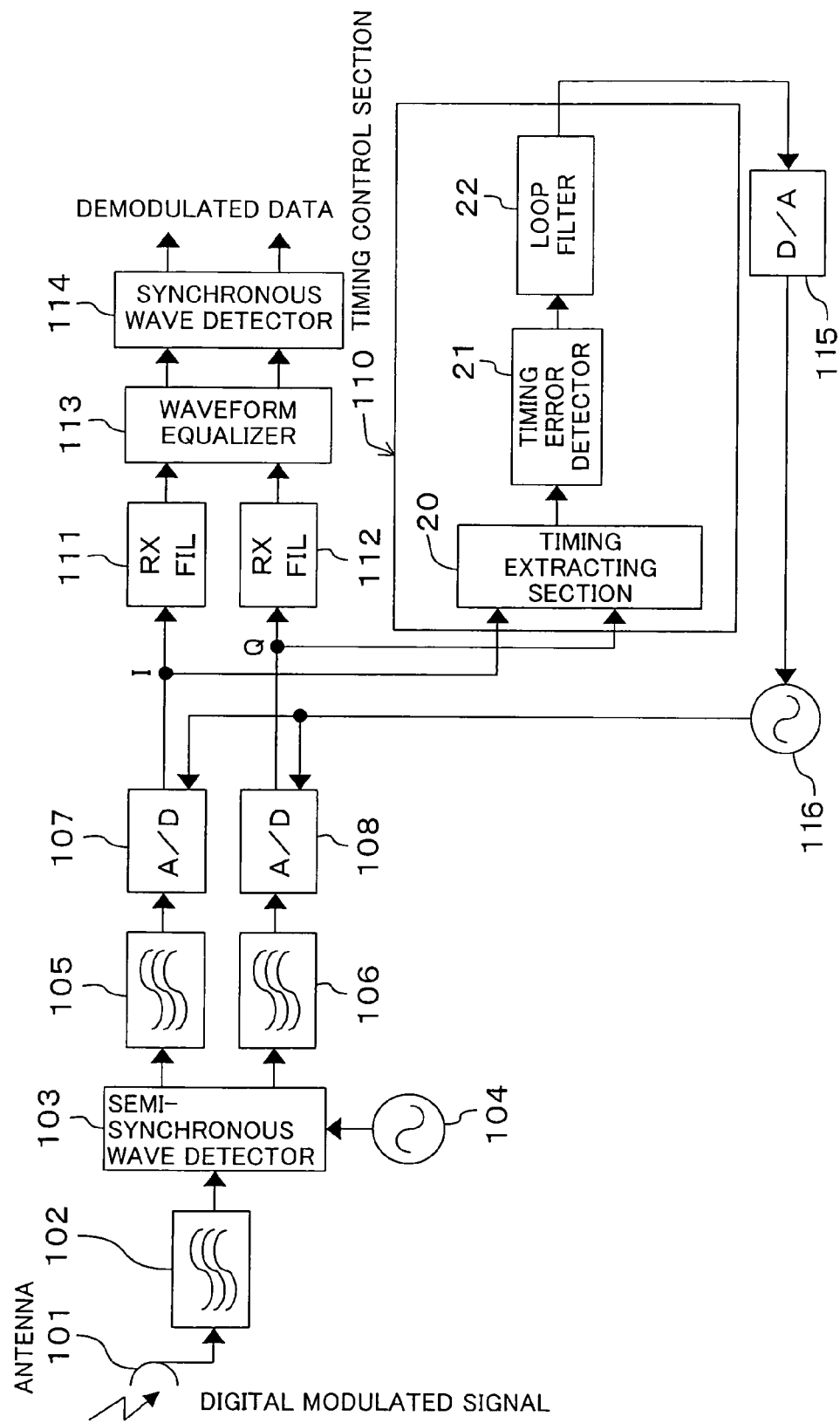
FIG. 18 shows the overall structure of a demodulator using a voltage-controlled oscillator according to a sixth embodiment.

FIG. 18 shows another example of the structure of the demodulator including the timing extractor of the present invention. The demodulator of FIG. 18 includes a D-to-A converter 115 and a voltage-controlled clock oscillator 116 instead of the rate converter 109 of FIG. 1. Unlike the demodulator of FIG. 1, the demodulator of FIG. 18 conducts timing control by using a feedback loop formed by the A-to-D converters 107, 108, the timing control section 110, the D-to-A converter 115 and the voltage-controlled clock oscillator 116.

The differences between the demodulator of FIG. 18 and the demodulator of FIG. 1 will now be described briefly. The A-to-D converters 107, 108 sample a complex baseband signal in response to a clock supplied from the voltage-controlled clock oscillator 116. This clock is twice the symbol rate fs. The A-to-D converters 107, 108 thus convert the complex baseband signal from analog to digital values.

The timing control section 110 receives the complex baseband signal. The timing extracting section 20 then extracts timing, and the timing error detector 21 detects a sample timing error generated in the A-to-D converters 107, 108. The loop filter 22 smoothes the timing error and outputs the resultant signal as a timing control signal. The D-to-A converter 115 converts the timing control signal received from the loop filter 22 to an analog signal. The voltage-controlled clock oscillator 116 is capable of controlling a clock oscillation frequency by a voltage value. The voltage-controlled clock oscillator 116 receives the timing control signal from the D-to-A converter 115 as a voltage value, and supplies to the A-to-D converters 107, 108 a clock having a frequency at which the timing control signal is stable.

As a result, operation can be conducted at a desired sample timing, whereby stable demodulation can be implemented.

INDUSTRIAL APPLICABILITY

As has been described above, according to the timing extractor and the timing extracting method of the present invention, the timing components for determining symbols are extracted from a digital modulated signal by using a sampling frequency which is twice the symbol rate fs. Even with such a sampling frequency, the timing components can be stably extracted without causing any interference with aliasing distortion components and without being affected by a carrier frequency offset. The present invention is therefore useful for applications such as modulation of digital modulation systems used in digital satellite TV broadcasting, digital cable TV broadcasting and the like.

What is claimed is:

1. A timing extractor for extracting a timing component for determining a symbol from a digital modulated signal having a symbol rate fs, comprising:
a frequency converting means for converting positive and negative frequency components of fs/2 included in a complex baseband signal to a frequency position fm (0<|fm|<fs/2), the complex baseband signal being obtained from the digital modulated signal and formed from an I signal and a Q signal;
a nonlinear processing means for at least squaring the I signal and the Q signal resulting from frequency conversion by the frequency converting means; and
a frequency extracting means for extracting from an output signal of the nonlinear processing means a frequency component 2fm, that is, a frequency component which is twice the frequency position fm, and outputting the extracted frequency component as a timing signal.

2. The timing extractor according to claim 1, wherein the frequency position fm is |fm|=fs/2M (where M is an integer of at least two).

3. The timing extractor according to claim 2, wherein M=2 and the frequency position fm is |fm|=fs/4.

4. The timing extractor according to claim 2, wherein M=4 and the frequency position fm is |fm|=fs/8.

5. The timing extractor according to claim 1 or 2, wherein the frequency converting means includes a filtering means for removing in advance from the complex baseband signal a frequency component which will become an aliasing distortion component for the frequency component 2fm included in the output signal of the nonlinear processing means.

6. The timing extractor according to claim 1, wherein the frequency converting means includes a first frequency shifting means for shifting a frequency of the complex baseband signal in a frequency increasing direction, and a second frequency shifting means for shifting a frequency of the complex baseband signal in a frequency decreasing direction.

7. The timing extractor according to claim 1, 2 or 6, wherein the frequency converting means includes a frequency shifting means for shifting a frequency of the complex baseband signal in a frequency increasing direction and a frequency decreasing direction by fs/2.

8. The timing extractor according to claim 1, wherein the frequency converting means includes a bandpass filtering means for extracting the positive and negative frequency components of fs/2 included in the complex baseband signal.

9. The timing extractor according to claim 3, wherein the frequency converting means includes a numerical operation means for calculating upon every two samplings a true value multiplied by $\sqrt{2}$ as the positive and negative frequency components of fs/2 converted to the frequency position fm.

10. The timing extractor according to claim 9, wherein the nonlinear processing means includes two multiplying means for squaring the I signal and the Q signal resulting from frequency conversion by the frequency converting means, respectively, an adder for adding the I and Q signals squared by the multiplying means, a bit shifting means for multiplying an output of the adder by ½, and a selecting means for selecting the output of the adder or an output of the bit shifting means.

11. The timing extractor according to claim 1 or 2, wherein the frequency extracting means outputs the timing signal once every L times when the frequency position fm is |fm|=fs/(2²×L) (where L is an integer of at least one).

12. The timing extractor according to claim 6, wherein the first and second frequency shifting means each includes a filtering means for removing in advance an interference component which is present in the frequency position fm.

13. The timing extractor according to claim 6, wherein the frequency converting means complex adds respective outputs of the first and second frequency shifting means.

14. A demodulator, comprising:
an antenna for receiving a digital modulated signal;
a semi-synchronous wave detecting means for quadrature-detecting the digital modulated signal received by the antenna to obtain a complex baseband signal formed from an I signal and a Q signal;
an A-to-D converting means for converting the complex baseband signal obtained by the semi-synchronous wave detecting means from analog to digital values; and
the timing extractor according to claim 1, wherein
the digital complex baseband signal obtained by the A-to-D converting means is sampled at a sampling frequency 2fs based on a timing signal from the timing extractor, whereby demodulated data is obtained.

15. A method for extracting a timing component for determining a symbol from a digital modulated signal having a symbol rate fs, comprising the steps of:
converting positive and negative frequency components of fs/2 included in a complex baseband signal to a frequency position fm (0<|fm|<fs/2), the complex baseband signal being obtained from the digital modulated signal and formed from an I signal and a Q signal;
at least squaring the I signal and the Q signal resulting from the frequency conversion;
adding the squared I and Q signals; and
extracting from the added signal a frequency component 2fm, that is, a frequency component which is twice the frequency position fm, as a timing signal.

16. The method according to claim 15, wherein the frequency position fm is |fm|=fs/2M (where M is an integer of at least two).

* * * * *